(12) United States Patent
Tada et al.

(10) Patent No.: US 8,554,908 B2
(45) Date of Patent: Oct. 8, 2013

(54) DEVICE, METHOD, AND STORAGE MEDIUM FOR DETECTING MULTIPLEXED RELATION OF APPLICATIONS

(75) Inventors: Yuuki Tada, Kawasaki (JP); Yasushi Kobayashi, Kawasaki (JP); Kazuyuki Sakai, Kawasaki (JP); Kazuki Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 13/094,269

(22) Filed: Apr. 26, 2011

(65) Prior Publication Data

US 2012/0054324 A1 Mar. 1, 2012

(30) Foreign Application Priority Data

Aug. 25, 2010 (JP) ................................. 2010-188794

(51) Int. Cl.
*G06F 15/173* (2006.01)
(52) U.S. Cl.
USPC .......................................... 709/224; 709/223
(58) Field of Classification Search
USPC ................................................ 709/223–226
See application file for complete search history.

(56) References Cited

U.S. PATENT DOCUMENTS

| 7,774,456 B1 * | 8/2010 | Lownsbrough et al. ...... 709/224 |
| 2005/0190692 A1 * | 9/2005 | Singh et al. ................... 370/229 |

FOREIGN PATENT DOCUMENTS

| JP | 2006-519439 | 8/2006 |
| JP | 2007-534066 | 11/2007 |
| WO | 2004/075036 | 9/2004 |
| WO | 2005/103928 | 11/2005 |

* cited by examiner

*Primary Examiner* — Brendan Higa
(74) *Attorney, Agent, or Firm* — Staas & Halsey LLP

(57) ABSTRACT

A configuration information collection unit 1502 and a transaction collection unit 1503 collect a transaction as the configuration information about an IT system and communication data, and stores them in a CMDB 1504. A multiplexed application detection unit 1501 detects as a candidate for a multiplexed application the software of applications multiplexed by evaluating whether or not the application names of the software of applications deployed to a target to be monitored on the IT system match each other. Then, it detects a multiplexed application by evaluating whether or not one or more of evaluation items of a subnet in which a candidate for a multiplexed application is performed, transaction context as the data relating to the names of an applications performed before and after the candidate for a multiplexed application, and transaction information as the transmission/reception data of the candidate for a multiplexed application match each other.

15 Claims, 47 Drawing Sheets

|          | APPLICATION NAME | SUBNET | TRANSACTION CONTEXT | TRANSACTION INFORMATION |
|----------|:---:|:---:|:---:|:---:|
| DEVICE A | ○ |   |   |   |
| DEVICE B | ○ | ○ |   |   |
| DEVICE C | ○ |   | ○ |   |
| DEVICE D | ○ |   |   | ○ |
| B+C      | ○ | ○ | ○ |   |
| B+D      | ○ | ○ |   | ○ |
| C+D      | ○ |   | ○ | ○ |
| B+C+D    | ○ | ○ | ○ | ○ |

F I G. 7

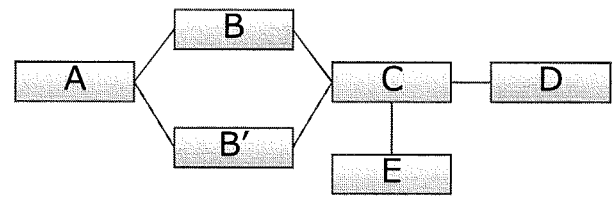
Con1 A→B→C→D→C→E→C→B→A
Con2 A→B'→C→D→C→E→C→B'→A
F I G. 8

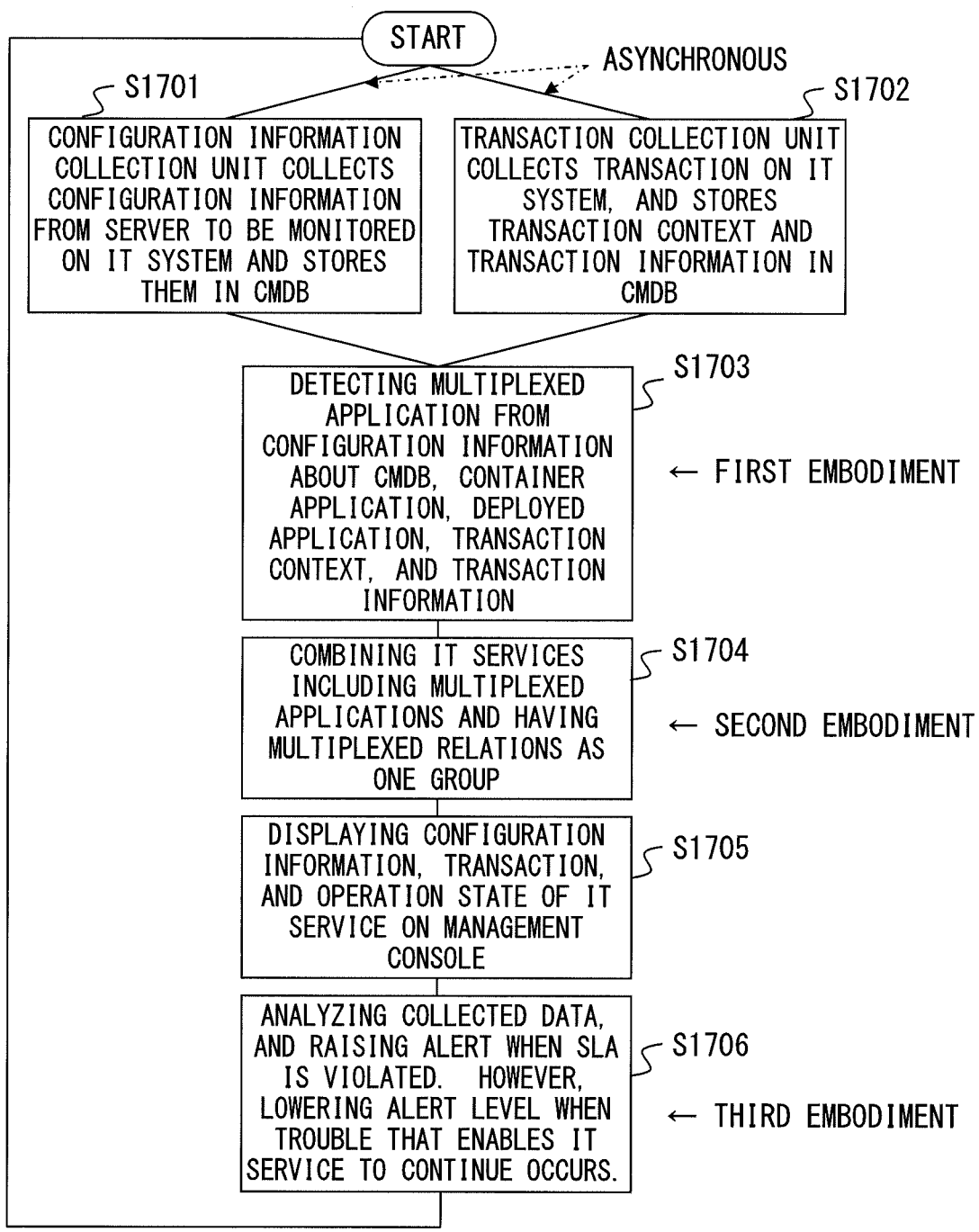
F I G. 1 7

(a) CONVENTIONAL ALERT
(b) ALERT USING NEW FUNCTION
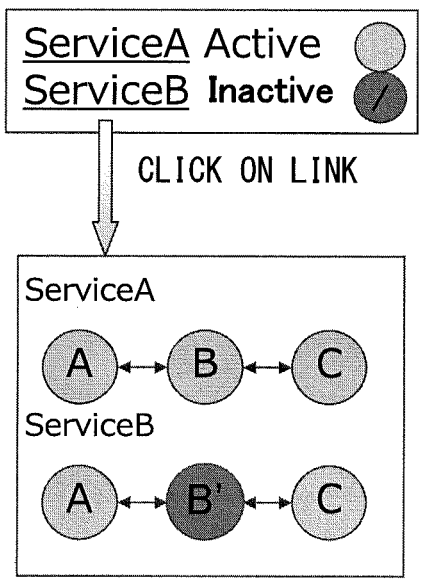
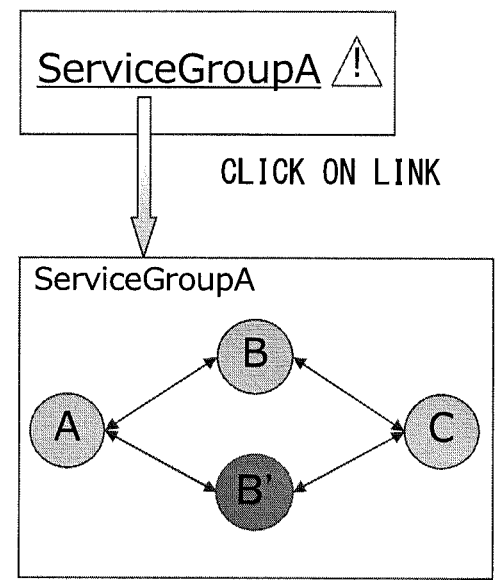
F I G. 1 8

| InstanceID | IP | SUBNET MASK | CONTAINER APPLICATION NAME | DEPLOYED APPLICATION NAME | STATE | DETAILED STATUS |
|---|---|---|---|---|---|---|
| Ins1 | 192.168.0.3 | 255.255.255.0 | Interstage | AppA | Active | — |
|  |  |  |  | AppB | Active | — |
| Ins2 | 192.168.0.4 | 255.255.255.0 | Interstage | AppA | Active | — |
|  |  |  |  | AppB | Active | — |
| Ins3 | 192.168.0.5 | 255.255.255.0 | Interstage | AppA | Active | — |
|  |  |  |  | AppB | Active | — |
| Ins4 | 192.168.1.6 | 255.255.255.0 | Interstage | AppA | Active | — |
|  |  |  |  | AppB | Active | — |
| ⋮ | ⋮ | ⋮ | ⋮ | ⋮ | ⋮ | ⋮ |

F I G. 2 0

| InstanceID | PRECEDING APPLICATION | CONTAINER APPLICATION NAME | SUBSEQUENT APPLICATION |
|---|---|---|---|
| Ins1 | Apache | Interstage | Symfoware |
| Ins2 | Apache | Interstage | Symfoware |
| Ins3 | IIS | Interstage | MySQL |

| InstanceID | TRANSACTION TYPE | SOURCE IP | DESTINATION IP | REQUEST MESSAGE | RESPONSE MESSAGE |
|---|---|---|---|---|---|
| Ins 1 | RECEIVED TRANSACTION | 192.168.0.7 | 192.168.0.3 | PERFORMING App A | CLIENT PAGE |
| | TRANSMISSION TRANSACTION | 192.168.0.3 | 192.168.0.9 | REFERENCE TO CLIENT DATA | CLIENT DATA |
| Ins 2 | RECEIVED TRANSACTION | 192.168.0.7 | 192.168.0.4 | PERFORMING App A | CLIENT PAGE |
| | TRANSMISSION TRANSACTION | 192.168.0.4 | 192.168.0.9 | REFERENCE TO CLIENT DATA | CLIENT DATA |
| Ins 3 | RECEIVED TRANSACTION | 192.168.0.8 | 192.168.0.6 | PERFORMING App B | EMPLOYEE PAGE |
| | TRANSMISSION TRANSACTION | 192.168.0.6 | 192.168.0.10 | REFERENCE TO EMPLOYEE DATA | EMPLOYEE DATA |

FIG. 26B

| PERFORMING App A | REQUEST:HTTP:GET(/AppA/service.ja,id,mode.type)RESPONSE:HTTP:200(text/html) |
|---|---|
| PERFORMING App B | REQUEST:HTTP:GET(/AppB/view.ja,id,group.code)RESPONSE:HTTP:200(text/html) |
| REFERENCE TO CLIENT DATA | REQUEST:Symfoware:Select id FROM customer;RESPONSE:result |
| REFERENCE TO EMPLOYEE DATA | REQUEST:Symfoware:Select id FROM employee;RESPONSE:result |

| InstanceID | IP | SUBNET MASK | CONTAINER APPLICATION NAME | DEPLOYED APPLICATION NAME | STATE | DETAILED STATUS |
|---|---|---|---|---|---|---|
| Ins 1 | 192.168.0.3 | 255.255.255.0 | Interstage | AppA | Active | — |
| | | | | AppB | Active | — |
| Ins 2 | 192.168.0.3 | 255.255.255.0 | Interstage | AppA | Active | — |
| | | | | AppC | Active | — |

InstanceCI

FIG. 30A

| InstanceID | PRECEDING APPLICATION | DEPLOYED APPLICATION OF PRECEDING APPLICATION | CONTAINER APPLICATION NAME | SUBSEQUENT APPLICATION | DEPLOYED APPLICATION OF SUBSEQUENT APPLICATION |
|---|---|---|---|---|---|
| Ins 1 | Apache | CLIENT PAGE | Interstage | Symfoware | CLIENT DATA |
| Ins 2 | Apache | CLIENT PAGE | Interstage | Symfoware | CLIENT DATA |

TRANSACTION CONTEXT

FIG. 30B

| InstanceID | TRANSACTION TYPE | SOURCE IP | DESTINATION IP | REQUEST MESSAGE | RESPONSE MESSAGE |
|---|---|---|---|---|---|
| Ins 1 | RECEIVED TRANSACTION | 192.168.0.7 | 192.168.0.3 | PERFORMING App A | CLIENT PAGE |
| Ins 1 | TRANSMISSION TRANSACTION | 192.168.0.3 | 192.168.0.9 | REFERENCE TO CLIENT DATA | CLIENT DATA |
| Ins 2 | RECEIVED TRANSACTION | 192.168.0.7 | 192.168.0.4 | PERFORMING App A | CLIENT PAGE |
| Ins 2 | TRANSMISSION TRANSACTION | 192.168.0.4 | 192.168.0.9 | REFERENCE TO CLIENT DATA | CLIENT DATA |

TRANSACTION INFORMATION

F I G. 30C

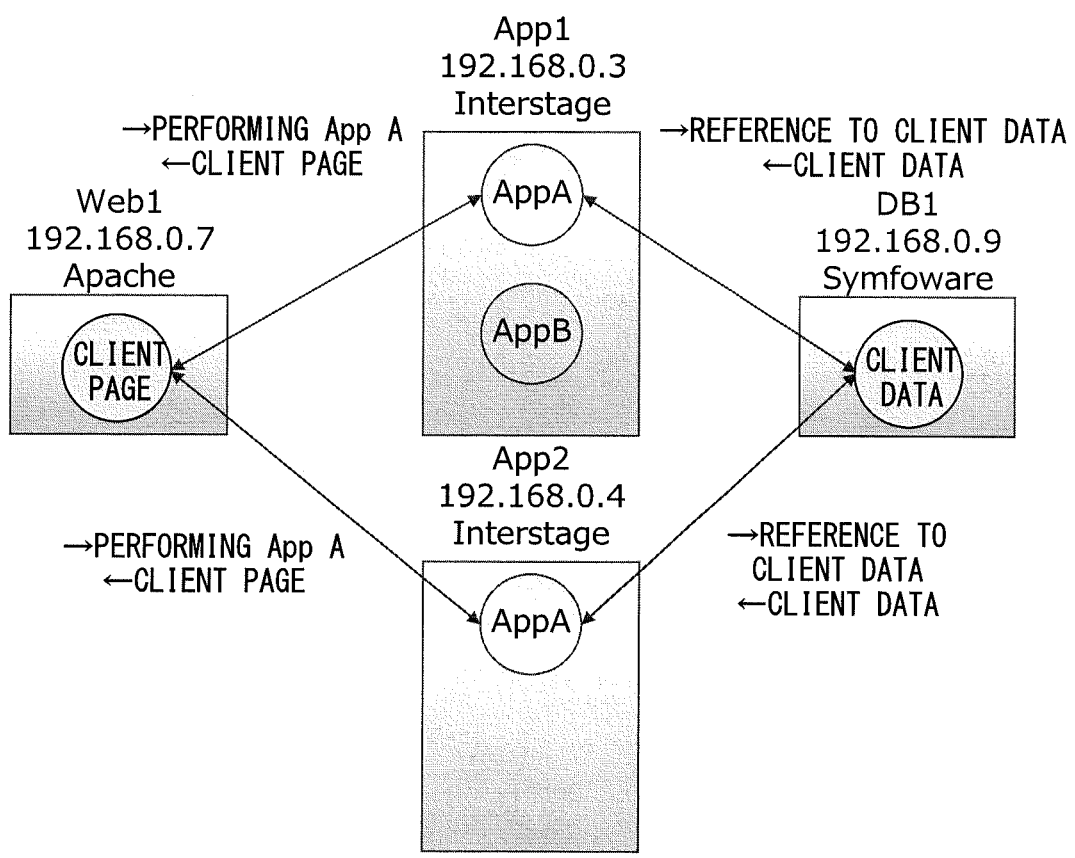
F I G. 3 1

| InstanceID | IP | SUBNET MASK | CONTAINER APPLICATION NAME | DEPLOYED APPLICATION NAME | STATE | DETAILED STATUS |
|---|---|---|---|---|---|---|
| Ins 1 | 192.168.0.3 | 255.255.255.0 | Interstage | AppA | Active | — |
| | | | | AppB | Active | — |
| Ins 2 | 192.168.0.3 | 255.255.255.0 | Interstage | AppA | Active | — |

InstanceCI

FIG. 32A

| InstanceID | PRECEDING APPLICATION | DEPLOYED APPLICATION OF PRECEDING APPLICATION | CONTAINER APPLICATION NAME | SUBSEQUENT APPLICATION | DEPLOYED APPLICATION OF SUBSEQUENT APPLICATION |
|---|---|---|---|---|---|
| Ins 1 | Apache | CLIENT PAGE | Interstage | Symfoware | CLIENT DATA |
| Ins 2 | Apache | CLIENT PAGE | Interstage | Symfoware | CLIENT DATA |

TRANSACTION CONTEXT

FIG. 32B

| InstanceID | TRANSACTION TYPE | SOURCE IP | DESTINATION IP | REQUEST MESSAGE | RESPONSE MESSAGE |
|---|---|---|---|---|---|
| Ins 1 | RECEIVED TRANSACTION | 192.168.0.7 | 192.168.0.3 | PERFORMING App A | CLIENT PAGE |
| Ins 1 | TRANSMISSION TRANSACTION | 192.168.0.3 | 192.168.0.9 | REFERENCE TO CLIENT DATA | CLIENT DATA |
| Ins 2 | RECEIVED TRANSACTION | 192.168.0.7 | 192.168.0.4 | PERFORMING App A | CLIENT PAGE |
| Ins 2 | TRANSMISSION TRANSACTION | 192.168.0.4 | 192.168.0.9 | REFERENCE TO CLIENT DATA | CLIENT DATA |

TRANSACTION INFORMATION

FIG. 32C

ServiceA Inctive

ALERT AT NORMAL LEVEL

F I G. 3 8 A

ServiceGroupA  Critical
├ ServiceA     Inactive
└ ServiceB     Inactive

ALERT AT HIGHER IMPACT LEVEL

F I G. 3 8 B

ServiceGroupA  Warning
├ ServiceA     Active
└ ServiceB     Inactive

ALERT AT LOWER IMPACT LEVEL

F I G. 3 8 C

```
Number of result: 2
<?xml version="1.0" encoding="UTF-8"?>
<cmdb:it id="1" type="Instance">
  <cmdb:rec type="observed">
    <ns:Instance id="192.168.1.3_interstage_a" ipAddress="192.168.1.3" status="active" type="Interstage">
    </ns:Instance>
  </cmdb:rec>
</cmdb:it>
<?xml version="1.0" encoding="UTF-8"?>
<cmdb:it id="5" type="Instance">
  <cmdb:rec type="observed">
    <ns:Instance id="192.168.1.4_interstage_a " ipAddress="192.168.1.4" status="active" type="Interstage">
    </ns:Instance>
  </cmdb:rec>
</cmdb:it>
```

FIG. 39

```
Number of result: 2
<?xml version="1.0" encoding="UTF-8"?>
<cmdb:it id="21" type="LogicalServer">
<cmdb:rec type="observed">
<ns:LogicalServer hostname="192.168.1.3" id="192.168.1.3" ipAddress="192.168.1.3">
<ns:SystemSettings>
<ns:Network gateway="" hostname="192.168.1.3" subnetAddress="192.168.1.0" subnetMask="255.255.255.0"/>
</ns:SystemSettings>
</ns:LogicalServer>
</cmdb:rec>
</cmdb:it>
<?xml version="1.0" encoding="UTF-8"?>
<cmdb:it id="22" type="LogicalServer">
<cmdb:rec type="observed">
<ns:LogicalServer hostname="192.168.1.4" id="192.168.1.4" ipAddress="192.168.1.4">
<ns:SystemSettings>
<ns:Network gateway="" hostname="192.168.1.4" subnetAddress="192.168.1.0" subnetMask="255.255.255.0"/>
</ns:SystemSettings>
</ns:LogicalServer>
</cmdb:rec>
</cmdb:it>
```

FIG. 40

```
Number of result: 4
<?xml version="1.0" encoding="UTF-8"?>
<cmdb:it id="31" type="TransactionContext">
<cmdb:rec type="observed">
<ns:TransactionContext>
<ns:TransactionContextFrom id="192.168.1.2_web1_a" ipAddress="192.168.1.2" type="web1"/>
<ns:TransactionContextLocal id="192.168.1.3_Interstage_a" ipAddress="192.168.1.3" type="Interstage"/>
<ns:TransactionContextTo id="192.168.1.5_DB1_a" ipAddress="192.168.1.5" type="DB1"/>
</ns:TransactionContext>
</cmdb:rec>
</cmdb:it>
<?xml version="1.0" encoding="UTF-8"?>
<cmdb:it id="32" type="TransactionContext">
<cmdb:rec type="observed">
<ns:TransactionContext>
<ns:TransactionContextFrom id="192.168.1.2_web1_a" ipAddress="192.168.1.2" type="web1"/>
<ns:TransactionContextLocal id="192.168.1.4_Interstage_a" ipAddress="192.168.1.4" type="Interstage"/>
<ns:TransactionContextTo id="192.168.1.5_DB1_a" ipAddress="192.168.1.5" type="DB1"/>
</ns:TransactionContext>
</cmdb:rec>
</cmdb:it>
<?xml version="1.0" encoding="UTF-8"?>
<cmdb:it id="33" type="TransactionContext">
<cmdb:rec type="observed">
<ns:TransactionContext>
<ns:TransactionContextFrom id="192.168.1.4_Interstage_a" ipAddress="192.168.1.4" type="Interstage"/>
<ns:TransactionContextLocal id="192.168.1.5_DB1_a" ipAddress="192.168.1.5" type="DB1"/>
<ns:TransactionContextTo id="192.168.1.6_DB2_a" ipAddress="192.168.1.6" type="DB2"/>
</ns:TransactionContext>
</cmdb:rec>
</cmdb:it>
```

FIG. 41

```
TABLE 9 (CONTINUED)
<?xml version="1.0" encoding="UTF-8"?>
<cmdb:it id="34" type="TransactionContext">
  <cmdb:rec type="observed">
    <ns:TransactionContext>
      <ns:TransactionContextFrom id="" ipAddress="" type=""/>
      <ns:TransactionContextLocal id="192.168.1.2_web1_a" ipAddress="192.168.1.2" type="web1"/>
      <ns:TransactionContextTo id="192.168.1.3_Interstage_a" ipAddress="192.168.1.3" type="Interstage"/>
    </ns:TransactionContext>
  </cmdb:rec>
</cmdb:it>
<?xml version="1.0" encoding="UTF-8"?>
<cmdb:it id="35" type="TransactionContext">
  <cmdb:rec type="observed">
    <ns:TransactionContext>
      <ns:TransactionContextFrom id="" ipAddress="" type=""/>
      <ns:TransactionContextLocal id="192.168.1.2_web1_a" ipAddress="192.168.1.2" type="web1"/>
      <ns:TransactionContextTo id="192.168.1.4_Interstage_a" ipAddress="192.168.1.4" type="Interstage"/>
    </ns:TransactionContext>
  </cmdb:rec>
</cmdb:it>
```

F I G. 4 2

```
Number of result: 2
<?xml version="1.0" encoding="UTF-8"?>
<cmdb:it id="41" type="TransactionInformation">
  <cmdb:rec type="observed">
    <ns:TransactionInformation from="192.168.1.2_web1_a" fromIP="192.168.1.2" to="192.168.1.3_Interstage_a"
toIP="192.168.1.3" request="HTTP:GET(/AppA/service.ja,id,mode,type)" responce="HTTP:200(text/html)"/>
  </ns:TransactionInformation>
  </cmdb:rec>
</cmdb:it>
<?xml version="1.0" encoding="UTF-8"?>
<cmdb:it id="42" type="TransactionInformation">
  <cmdb:rec type="observed">
    <ns:TransactionInformation from="192.168.1.3_Interstage_a" fromIP="192.168.1.3" to="192.168.1.5_DB1_a"
toIP="192.168.1.5" request="Symfoware:Select id FROM customer;" responce="result"/>
  </ns:TransactionInformation>
  </cmdb:rec>
</cmdb:it>
<?xml version="1.0" encoding="UTF-8"?>
<cmdb:it id="43" type="TransactionInformation">
  <cmdb:rec type="observed">
    <ns:TransactionInformation from="192.168.1.2_web1_a" fromIP="192.168.1.2" to="192.168.1.4_Interstage_a"
toIP="192.168.1.4" request="HTTP:GET(/AppA/service.ja,id,mode,type)" responce="HTTP:200(text/html)"/>
  </ns:TransactionInformation>
  </cmdb:rec>
</cmdb:it>
<?xml version="1.0" encoding="UTF-8"?>
<cmdb:it id="44" type="TransactionInformation">
  <cmdb:rec type="observed">
    <ns:TransactionInformation from="192.168.1.4_Interstage_a" fromIP="192.168.1.4" to="192.168.1.5_DB1_a"
toIP="192.168.1.5" request="Symfoware:Select id FROM customer;" responce="result"/>
  </ns:TransactionInformation>
  </cmdb:rec>
</cmdb:it>
```

FIG. 43

```
Number of result: 2
<?xml version="1.0" encoding="UTF-8"?>
<cmdb:it id="51" type="ITService">
  <cmdb:rec type="observed">
    <ns:ITService
list="192.168.1.2_web1_a;192.168.1.3_Interstage_a;192.168.1.5_DB1_a;192.168.1.5_DB2_a" />
  </cmdb:rec>
</cmdb:it>
<?xml version="1.0" encoding="UTF-8"?>
<cmdb:it id="52" type="ITService">
  <cmdb:rec type="observed">
    <ns:ITService
list="192.168.1.2_web1_a;192.168.1.4_Interstage_a;192.168.1.5_DB1_a;192.168.1.5_DB2_a" />
  </cmdb:rec>
</cmdb:it>
```

FIG. 44

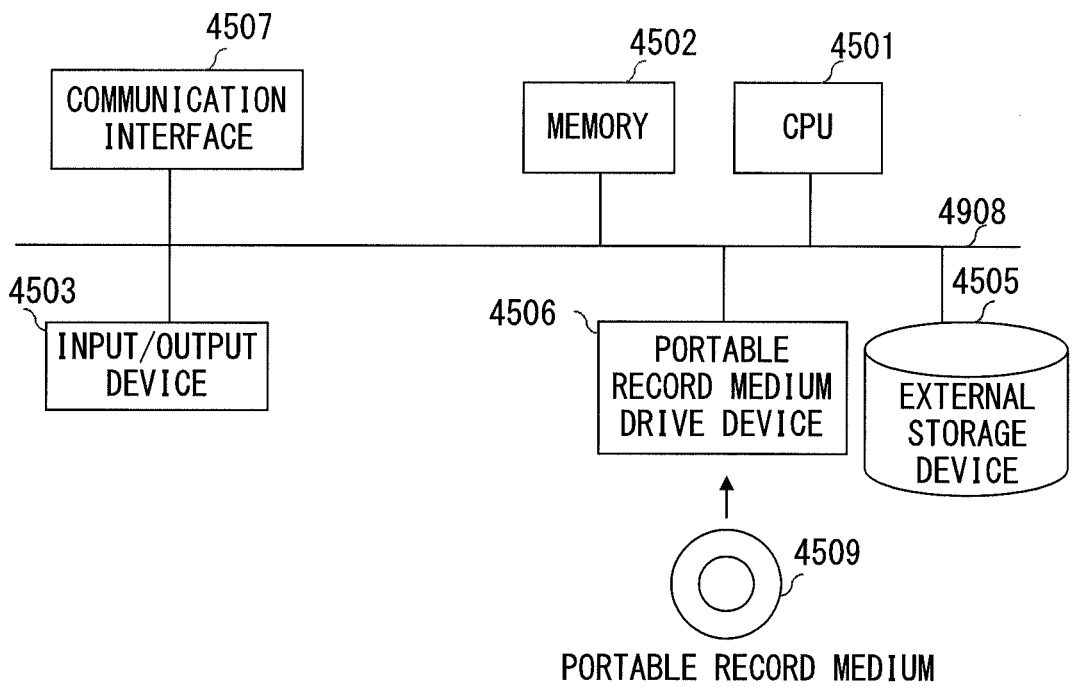
F I G. 4 5

DEVICE, METHOD, AND STORAGE MEDIUM FOR DETECTING MULTIPLEXED RELATION OF APPLICATIONS

CROSS-REFERENCE TO RELATED APPLICATIONS

This application is based upon and claims the benefit of priority of the prior Japanese Patent Application No. 2010-188794, filed on Aug. 25, 2010, the entire contents of which are incorporated herein by reference.

FIELD

The present invention relates to a device, a method, and a program for detecting the multiplexed relation of applications in a distributed computing environment.

BACKGROUND

In the technology of managing an application performed on an IT (information technology) system by monitoring configuration information and a transaction, it is necessary to dynamically detecting how the computer in the system is linked to realize an IT service. With the technology, an operation manager can manage an operation and perform troubleshooting on an IT system from the viewpoint of an IT service.

For example, if an instruction on a Web page monitored by a user becomes invalid in the IT service in which a Web server, an application server, and a database server are linked to perform an operation, it is necessary to know where among the servers for realizing the service the problem has occurred.

As the prior art for realizing the above-mentioned monitoring function, there is a well-known technique for collecting and analyzing a transaction communicated among a Web server, an application server, and a database server in an IT system to be monitored.

There also is a well-known technique of collecting the configuration information about each computer in an IT system and the information about an application.

Furthermore, there is a technique which discloses the architecture of multiplexed computer system in which an application program is simultaneously executed on a plurality of computers (for example, Patent Document 1).

There also is a well-known technique of generating a user behavior profile about a specific transaction access pat of a user authorized in application software etc., and detecting an exceptional transaction activity (for example, the technique described in Patent Document 2).

In the IT system generated by a corporation, an application configuring an IT service is multiplexed and operated in a distributed computing environment to distribute a load and avoid a risk.

DOCUMENTS OF PRIOR ART

[Patent Document 1] National Publication of International Patent Application No. 2007-534066
[Patent Document 2] National Publication of International Patent Application No. 2006-519439

However, since the prior art cannot detect whether or not there is a multiplexed application in an IT system, even a multiplexed application is determined as a separate application.

Therefore, the prior art cannot detect the difference between the case in which apart of an application multiplexed to distribute a load generates trouble and a part of an IT service stops and the case in which trouble occurs in a non-multiplexed application and the entire IT service stops.

SUMMARY

An aspect of the present invention is a device for detecting the multiplexed relation of applications including: a device for collecting configuration information about an information system and communication data transmitted in the information system; and a multiplexed application detection unit for detecting a multiplexed application which is deployed to any device to be monitored in the information system and in which a plurality of applications sharing the same application name are detected.

A multiplexed application can be detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a list of combinations of each method according to the first embodiment of the present invention;
FIG. 8 is an explanatory view of detecting a multiplexed application according to transaction context or transaction information;
FIG. 17 is a flowchart of the entire process of an embodiment of the present invention;
FIG. 18 is an explanatory view of a difference in method of notifying an alert;
FIG. 20 is an example of a data configuration of a candidate for a multiplexed application.

FIG. 24 is an example of a data configuration of transaction context;

FIG. 26 is an example of a data configuration according to transaction information;

FIG. 30 is an example of detecting data of a multiplexed application in which application names indicate inclusive relation;

FIG. 31 is an explanatory view of detecting a multiplexed application in which application names partially match;

FIG. 32 is an explanatory view of a detecting operation of a multiplexed application in which application names indicate inclusive relation;

FIG. 38 is an example of displaying an alert;

FIG. 39 is an example of acquired data of a list of container application names from the CMDB;

FIG. 40 is an example of acquired data of a subnet address from the CMDB;

FIG. 41 is an example (1) of acquired data of transaction context from the CMDB;

FIG. 42 is an example (2) of acquired data of transaction context from the CMDB;

FIG. 43 is an example of data of transaction information acquired from the CMDB;

FIG. 44 is an example of data of an IT service acquired from the CMDB; and

FIG. 45 is a configuration of a hardware system capable of realizing the system according to an embodiment of the present invention.

DESCRIPTION OF EMBODIMENTS

The embodiments of the present invention are described below in detail with reference to the attached drawings.

Described first is the application management technology for a common IT system.

Figure 1:
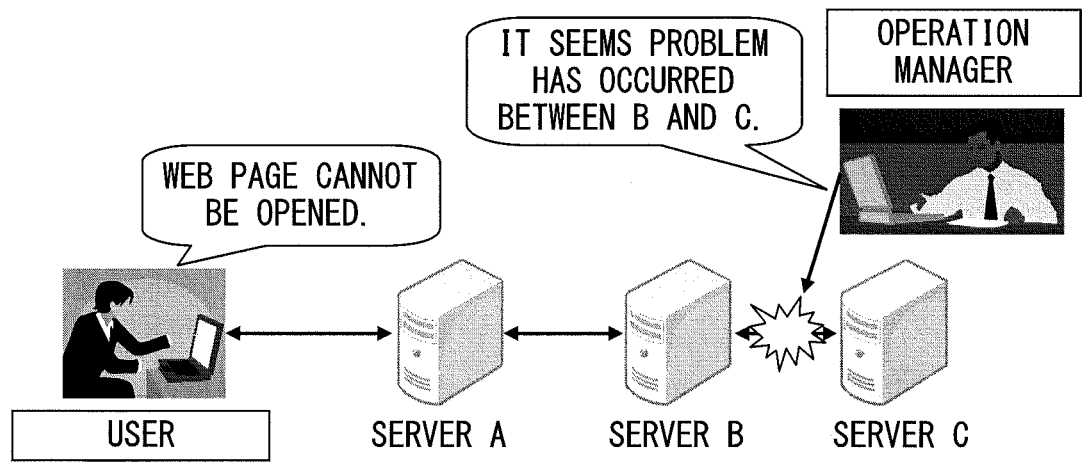
FIG. 1 is an example of troubleshooting by common IT system monitoring.
Figure 2:
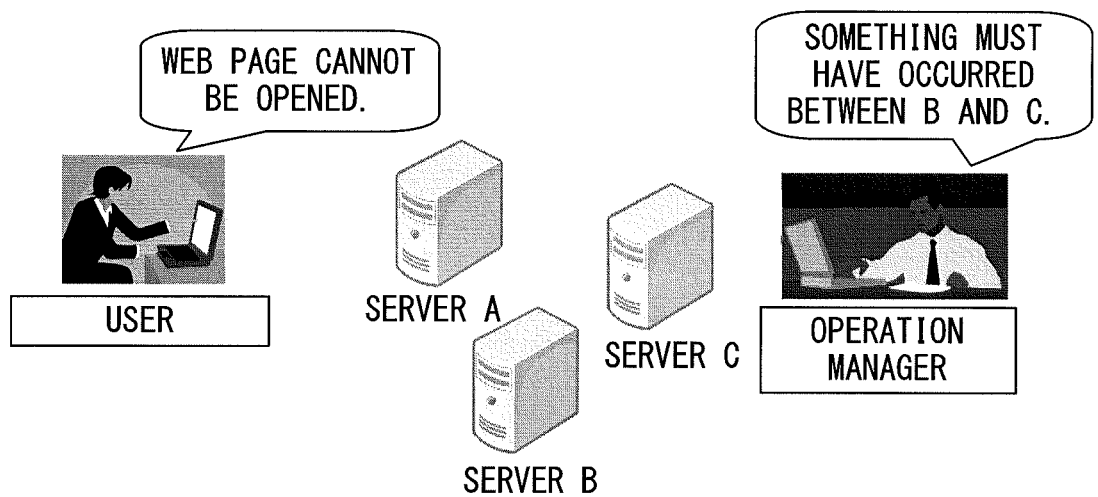
FIG. 2 is an example in which IT system monitoring is not performed.

For example, as illustrated in FIG. 1, when an instruction becomes invalid on a Web page browsed by a user in the operation and management of a common IT system, the relation among the servers A, B, and C realizing the service is known, and it can be understood that, for example, a problem has occurred between the servers B and C. On the other hand, as illustrated in FIG. 2, the countermeasure against trouble is delayed unless the relation among the servers is understood.

Figure 3:
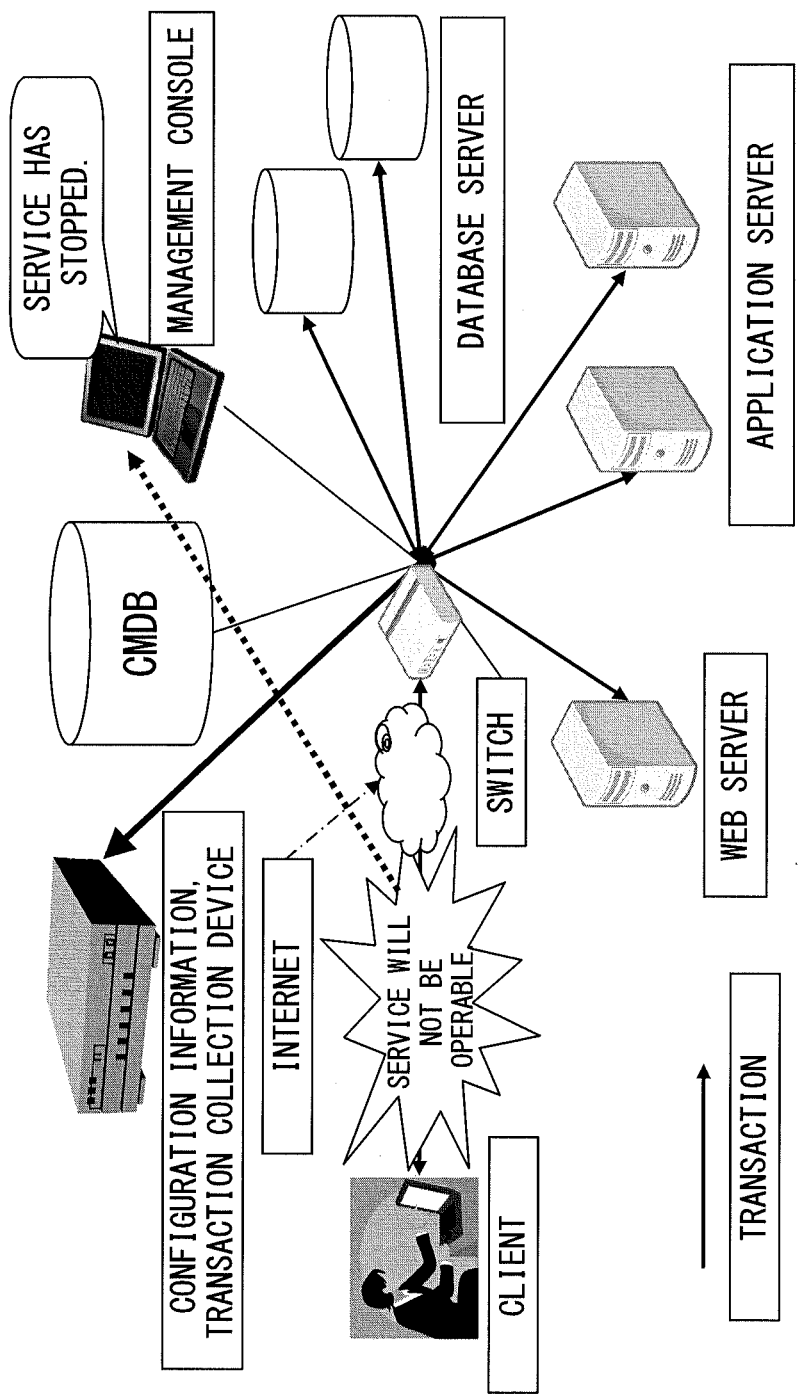
FIG. 3 is an entire configuration of a common IT system.

In a common IT system, as illustrated in FIG. 3, the transaction information among a Web server, an application server, and a database server to be monitored is stored in a transaction collection device. The transaction collection device analyzes the contents of a transaction. The transaction collection device also collects the configuration information about each computer in an IT system, and the information about a container application and an application deployed on the container application. The data collected by the transaction collection device is stored in the configuration management database (CMDB). Then the collected information is enabled to be browsed through a management console. When the IT service to be monitored violates the defined service level, an alert occurs to report the problem to the operation manager.

Each term used in the following descriptions is defined as follows.

IT System

An information processing system generated to realize corporation activities.

IT Service

A group of servers, storage units, and applications. They are linked to provide a user with valuable services.

Configuration Information

Information about server hardware, software, a process, an application, etc. of an IT system. The container application and deployed application described later are included in the information.

CMDB

Short for configuration management database. Configuration management database. It centrally manages the information about all configuration items configuring an IT system. It manages each configuration item by associating it with one another.

Transaction Information

Information about the signal transmitted by a computer in an IT system to another computer through a network cable, that is, communication data. The information includes an IP address of a transaction source, an IP address of the destination which receives the transaction, a request message of the transaction, the response message to the request message.

Container Application

Basic software for providing the function of configuring an IT service such as a Web server, an application server, a database server, etc. For example, a Web server such as Apache HTTP Server, IIS, etc., an application server such as Interstage, Tomcat, JBoss, Weblogic, etc., and a database server such as Symfoware, Oracle Database Server, My SQL, etc. "Apache" is a registered trademark of Apache Software Foundation. "Interstage" and "Symfoware" are registered trademarks of Fujitsu Limited. "IIS" is a registered trademark of Microsoft Corporation. "My SQL" is a registered trademark of Microsystems.

Deployed Application

Program and data deployed in a container application. The application is to perform the process of an IT service. Example: Setting information about a Web server, a Java servlet, JSP, a table of a database, etc.

Deep Discovery Function

Function of detecting and monitoring a container application and a deployed application. To extract a name of an application (hereinafter referred to as an application name) of a container application and a deployed application, an operation state, setting information, etc.

SNMP

Short for simple network management protocol. A protocol for communicating information for monitoring and controlling network equipment.

Multiplexing

A plurality of container applications (or deployed applications) having the same functions are deployed (installed) to the same or a plurality of servers. A container application is installed and a deployed application is deployed, but generally the applications are installed.

Multiplexed Application

An application which is multiplexed is referred to as a multiplexed application.

Transaction Context

Preceding and subsequent relation data of a deployed application executed for realizing an IT service. For example, the order information about a transaction of the deployed application A of App 3 is executed from Web 2 and the deployed application A refers to the information about a table A of a DB 1 when an IT service A is executed in the order of Web 2, App 3, and DB 1 in FIG. 4 described later. It is acquired by analyzing the information in the transaction collection device.

Service Level

Level indicating the range and quality of an IT service.

There are the following problems in the common application management described with reference to FIGS. 1 through 3.

First, when an IT service is multiplexed, an erroneous alert may be generated. For example, in an IT system generated by a corporation, a container application configuring an IT service is multiplexed and operated to distribute a load and avoid a risk. However, in the common application management technology, sufficient information cannot be detected to determine the relationship between transactions. In the common application management technology, a transaction between computers which passes through network equipment is stored and collected and analyzed by the transaction collection device. If there is a specific identifier in the communication, a definition for determination of the name of the container application can be made. Therefore, it can be understood between which computers a transaction is communicated, and it can be determined what container application the communication is performed. However, there is no information enough to determine the relationship between the transactions. For example, although a multiplexed application can be detected if sufficient definitions are prepared to designate a multiplexed application by, for example, applications connected to the same load balancer, numerous definitions are required for each method of generating an IT system. Therefore, in the common application management technology, it cannot be easily detected that there is a multiplexed application in an IT system. Accordingly, although there is a multiplexed application, the applications are determined as separate applications. Therefore, the difference cannot be detected between the case in which a part of an application multiplexed to distribute a load generates trouble and a part of an IT service stops and the case in which trouble occurs in a non-multiplexed application and the entire IT service stops. Furthermore, when a part of an IT service stops, but the IT service actually can be continued, an erroneous alert may be generated by determining that the IT service has stopped.

When an IT service stops, there is a risk of a corresponding incurring a serious loss of, for example, the reliability of a user. Therefore, a necessary countermeasure is to be taken by a large number of persons, thereby driving up costs to solve the problem. On the other hand, if only a part of the IT service stops, the number of persons assigned to solve the problem can be decreased, thereby reducing the cost. Accordingly, it can be appropriate to easily detect one IT service by grouping a plurality of detected IT services into one when a management console detects a plurality of IT services.

Figure 4:
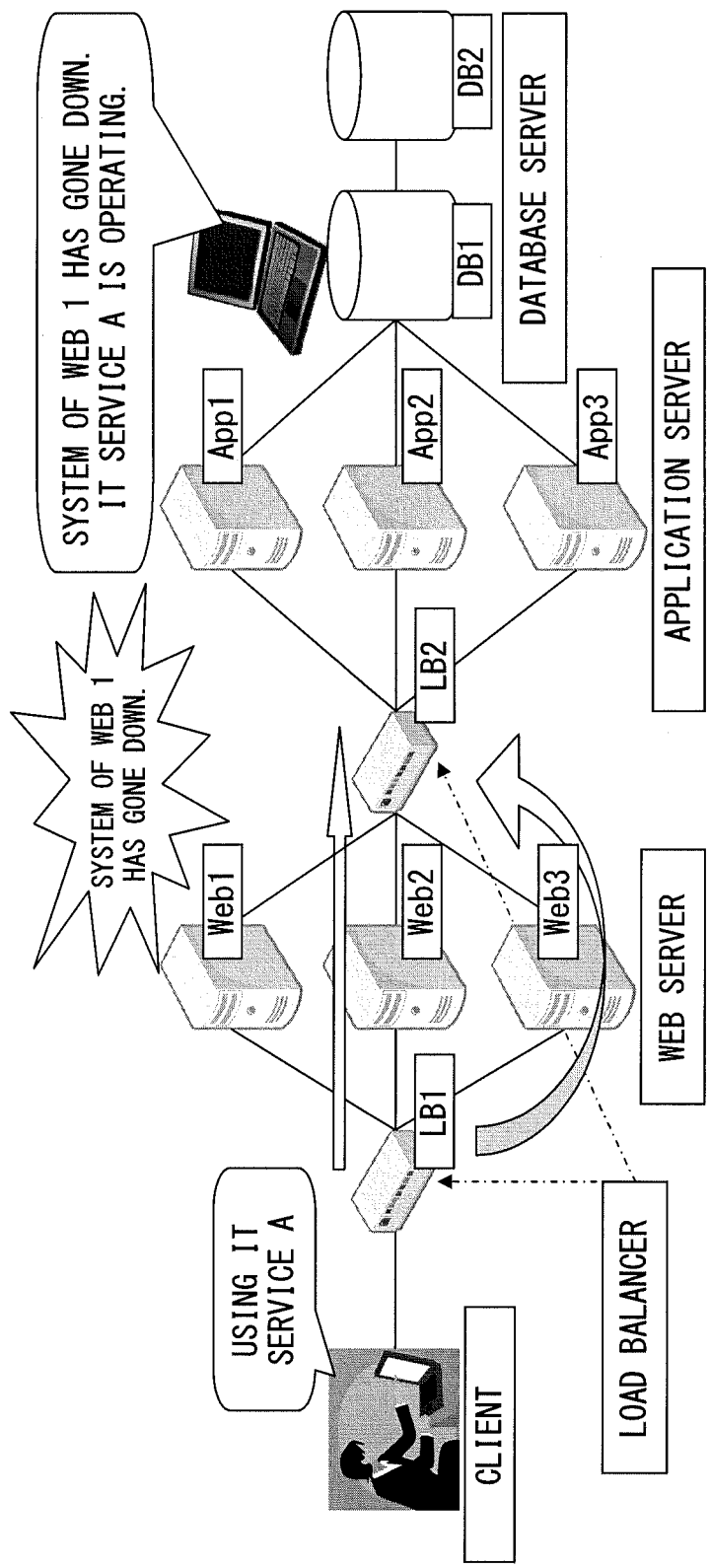
FIG. 4 is an explanatory view of an occurrence of an appropriate alert in accordance with an operation state.

In addition, for example in FIG. 4, Web servers Web 1, Web 2, and Web 3 connected to a load balancer LB 1 or application servers App 1, App 2, and App 3 connected to a load balancer LB 2 indicate a plurality of the same units. Therefore, they are multiplexed units. If the load balancer LB 1 can detect that the Web servers Web 1, Web 2, and Web 3 are multiplexed, then it can be indicated that the IT service A is operated although the Web server Web 1 goes down. When trouble occurs in a part of a server and software configuring an IT service, it is preferable to display data including the IT service of multiplexed relations. In addition, when an operation can be continued by services of other multiplexed relations, the alert level is set lower than the level at which the operation has stopped, and the operation manager has to take appropriate countermeasures against the risk. On the other hand, when it is detected that a plurality or all of the IT services of multiplexed relations have stopped, it is considered that the trouble indicates a higher impact than usual. Accordingly, it is necessary to raise the alert level.

Furthermore, when an IT service is multiplexed, the environment of detecting a multiplexed application is limited. For example, in the common application management technology, the configuration information to be monitored is monitored by the SNMP. When the configuration information is acquired by the SNMP from the load balancer on the network, it can be detected which server is multiplexed by the load balancer. However, this method cannot be used if the multiplexing is performed using equipment other than the load balancer as in, for example, the clustering environment having the configuration illustrated in FIG. 5 and the cloud environment having the configuration illustrated in FIG. 6.

Figure 5:
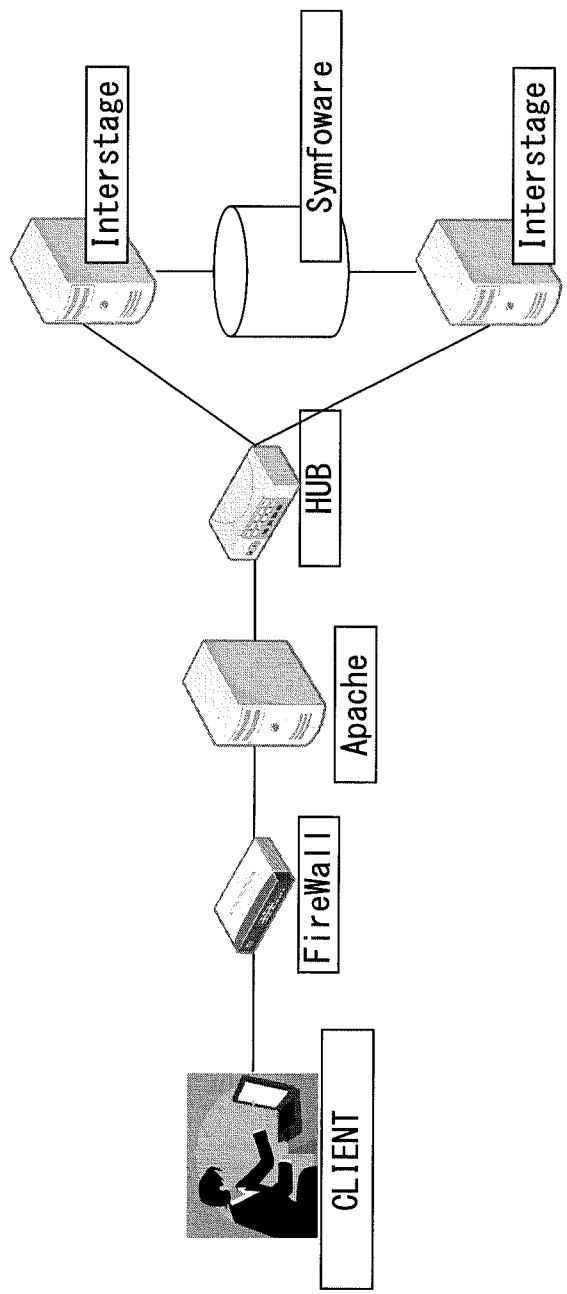
FIG. 5 is an example of clustering using no load balancer.

The clustering environment is a system in which a plurality of computers are combined as a cluster, and refers to software and hardware for realizing the system, and further a realized system. The plurality of computers in the cluster are interconnected over a network, and controlled to be used as one computer system. As a result, the performance and availability which cannot obtained by one computer can be acquired. In FIG. 5, for example, Interstage and Symfoware are clustered, and the Interstage is multiplexed in the cluster. Since the cluster cannot be processed by a load balancer, the multiplexed state cannot be detected.

Figure 6:
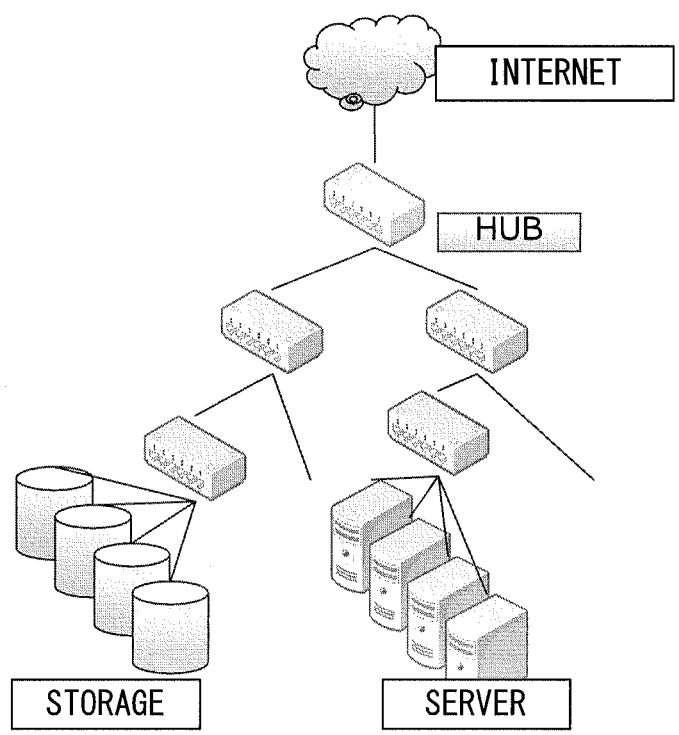
FIG. 6 is an example of a cloud environment using no load balancer.

The cloud environment refers to a use environment of a network-based computer. For example, the network is the Internet. In FIG. 6, a user uses as a cloud the entire computer resources connected to the Internet, and the IT service is used over a network. In the cloud environment, the multiplexed relation can be changed daily, but the multiplexed state cannot be detected.

An IT system generated by a corporation generally uses a method of improving the performance and availability by a clustering environment, and reducing the system generating cost by a cloud environment. Therefore, an applicable IT system is limited only in the system monitoring method using the SNMP. Therefore, a multiplexed application detecting method applicable to various environments is required.

Thus, in the embodiments described later, the functions of the following devices A, B, C, D, and E are implemented. FIG. 7 illustrates each of the devices A, B, C, and D according to the embodiments of the present invention. The device E is omitted in FIG. 7.

<Device A (Multiplexed Application Detection Unit)>

A multiplexed application is detected by evaluating whether or not the application names (container application names and deployed application names) of the applications deployed to a monitor target on an IT system match one another, and an appropriate alert is issued according to the information.

<Device B (Multiplexed Application Detection Unit)>

Obtained by adding the checking procedure of the subnet to the device A.

It is evaluated whether or not the application name matches the subnet. Thus, an erroneous detection of a multiplexed application can be reduced. According to the information about the detected multiplexed application, an appropriate alert is issued.

It is based on the concept that no multiplexing process is performed between different subnets.

<Device C (Multiplexed Application Detection Unit)>

Obtained by adding the checking procedure of the transaction context to the device A.

A multiplexed application is detected by analyzing the application name and the transaction context, and an appropriate alert is issued according to the information.

<Device D (Multiplexed Application Detection Unit)>

Obtained by adding the checking procedure of the transaction information to the device A.

A multiplexed application is detected by analyzing the application name and the transaction information, and an appropriate alert is issued according to the information.

<Device E (Multiplexed Application Detection Unit)>

In analyzing the transaction context of the device C and the transaction information about the device D, a multiplexed application is detected by detecting an application of a partially matching relation or an inclusive relation to the device A.

Furthermore, the devices above can be combined as necessary as illustrated in FIG. 7. The device A is the most fundamental method. The device B and the subsequent devices use more complicated detecting method lower in the vertical direction of the table. The device E is omitted in FIG. 7. Since it is considered that the simplest possible detecting method is to be selected from the viewpoint of the performance of a monitor system, the device A is first tried. If the multiplexed application understood by the operation manager is not detected, or if the state holds the erroneous detection described later or a detection omission condition, then the resource consumption can be reduced by stepwise using the devices B, C, and D. That is, a multiplexed application is detected using any of the devices B+C, B+D, C+D, B+C+D, or E. In addition, using the devices B+C+D from the beginning, a multiplexed application not understood by an operation manager can be detected.

Described below is each method.

(A) In the device A, an application name collected by the deep discovery function is used to detect a multiplexed application. Using the information, a combination of applications deployed for the same purpose can be detected. For example, application servers (App 1, App 2, and App 3) in FIG. 4 are multiplexed to distribute a load. It is considered that the same container applications and deployed applications are deployed to these application servers. Therefore, these application names are to match one another. Therefore, a multiplexed application can be detected by evaluating the application name.

However, using only the device A, there may occur an erroneous detection or an omission of detection in the following cases.

(1) The case in which there is no multiplexed application but there are matching application names (container application names or deployed application names) (erroneous detection)

Initial State

The state immediately after an application server etc. is installed. There is the possibility that a standard application is deployed in advance to any application server. It does not refer to the existence of a multiplexed application.

Developing Machine and Operating Machine

There is the possibility that the same application name is deployed to a developing machine and an operating machine.

Although a developing machine is located in an IT system, it is not necessarily multiplexed. However, if it is evaluated whether or not an application names match each other, an erroneous detection may occur.

If application names incidentally match each other, there is the possibility that different developers use the same application names.

If application names are intentionally made to match each other, there is the possibility that applications implemented with different functions but having the same names with a view to conducting a test etc. are deployed.

(2) The case in which there is a multiplexed application but application names do not match each other (omission of detection).

The case in which application names partially match and have inclusive relation.

If there is a multiplexed application and only a part of machines deploy other deployed applications, the multiplexed machine cannot be detected only by the matching of application names.

Due to the problems above, there is the possibility that an erroneous detection occurs or no detection can be performed only by evaluating the matching of application names. Then, it is evaluated whether or not subnets match each other (device B). Furthermore, transaction context (device C) and transaction information (device D) are used together.

(B) First, the device B can avoid a number of erroneous detections. For example, since it is generally rare that the developing machine and the operating machine are located in the same subnet, it is considered that they are placed in different subnets. Therefore, when non-matching subnets are detected, a candidate for a multiplexed application is not expected. The case in which there is the possibility that other erroneous detections occur can be excluded from candidates for multiplexed applications because it is not probable that it is placed in the same subnet as an operation environment.

Then, the device C or D can be selected.

(C) The device C uses transaction context together with an application name. The device evaluates "what preceding and subsequent applications are". By referring to the transaction context, the applications called before and after the multiplexed application are known. If an application functions as the same IT service, the applications called before and after the current application match (unless the preceding and subsequent applications are multiplexed).

The contents to be compared can be a method of using only a container application name, a method of using a combination of a container application name and a deployed application name, a method of using only a deployed application name. The accuracy can be more improved when an evaluation as deep as a deployed application name is performed. It is not limited to the applications immediately before or after the current application, but one preceding application and three subsequent applications can be added to comparison targets, thereby flexibly extending comparison targets.

For example, in the example in FIG. 8, there are transaction context Con 1 and Con 2, the transaction context Con 1 passes the server to which the application having the application name of B is deployed, and the transaction context Con 2 passes the server to which the application B' is deployed. In this example, there is one application, and the container application name is compared to detect a multiplexed application. The applications B and B' in FIG. 8 receive a request message from the application A, and transmit the request message to the application C. Therefore, the applications B and B' are multiplexed applications. To detect this, it is detected from the transaction context Con 1 that the preceding and subsequent applications to the application B are applications A and C respectively, and it is detected from the transaction context Con 2 that the preceding and subsequent applications to the application B' are applications A and C respectively, thereby detecting matching application names of the preceding and subsequent applications and determining multiplexed applications.

Since no transaction passes in the "initial state" in the device C, a candidate for a multiplexed application is not expected, and "the developing machine and operating machine", "the case in which application names incidentally match", and "the case in which application names are intentionally made to match" can be excluded from candidates for multiplexed applications because of different preceding and subsequent application names. The preceding and subsequent application names can incidentally match each other, but the case occurs only at a rate which can be substantially ignored.

(D) The device D is different from the device C in that is uses transaction information. The evaluation targets of the device are the request messages and the response messages to the application and the request message and the response message from the application. The applications providing the same functions match each other in request message and response message of the transaction information.

For example, if the applications B and B' in FIG. 8 receive a request from the application A and transmit a request message to the application C, the transactions transmitted from the application A to the applications B and B' indicate different destination IP but matching source IP, request message, and response message. The transactions transmitted from the applications B and B' to the application C indicate different source IP but matching destination IP, request message, and response message.

The condition that the names and the transaction information of the applications B and B' match each other (when the transaction is received by the application B or B', the information other than the destination IP, and when the transactions are transmitted from the applications B and B', the information other than the source IP) is evaluated. Thus, no transaction is passed in the case of the "initial stage". The transaction information is different in the cases of "developing machine and operating machine", "incidentally matching application names", and "intentionally matching application names". Thus, no candidate for a multiplexed application is expected.

The device D can use the method of evaluating only a request message and a response message. Thus, for example, when the preceding and subsequent applications are multiplexed as in the case in which a Web server is multiplexed before the application server illustrated in FIG. 4, the detection rate can be raised.

On the other hand, the method of determining multiplexing if matching is detected in plural types of transaction context or in all transaction information, the method of determining multiplexing if any transaction context or transaction information matches, etc. can be selected depending on the environment in the devices C and D. Thus, the case in which plural transactions pass between the preceding and subsequent applications in, for example, a database server can be evaluated. The calculation cost of the method for confirming whether or not all transaction context or transaction information is high, but this method can correctly detect a multiplexed application. On the other hand, in the method for confirming any matching transaction context or transaction information, the calculation can be completed when a matching condition is detected, thereby reducing the calculation cost.

(E) The device E can be applied when multiplexing is detected but the application names do not match. The device E can prevent the omission of detection of a multiplexed application by detecting, in addition to the application name of the device A, an application of an inclusive relation or a partially matching relation in the analysis of the transaction context of the device C or in the analysis of the transaction information about the device D.

Figure 9:
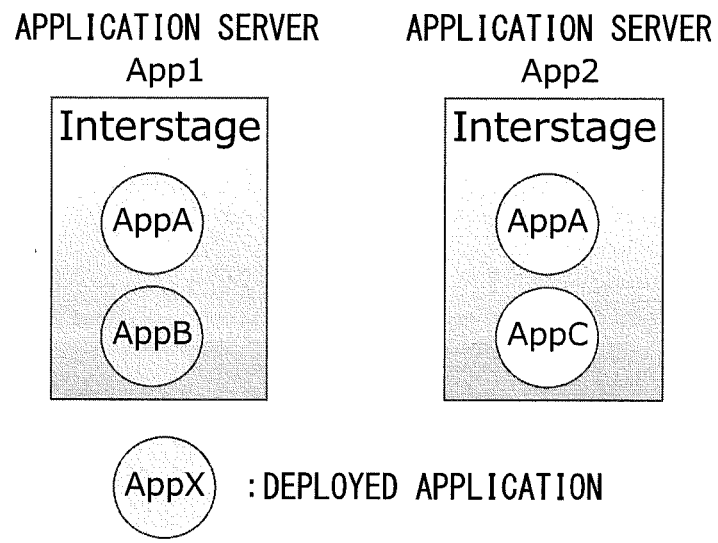
FIG. 9 is an example of partial matching of application names.

For example, the case in which an application has a partially matching relation is illustrated in FIG. 9. In FIG. 9, there are application servers App 1 and App 2, and deployed applications App A and App B are deployed to the container application Interstage installed on the application server App 1. The deployed applications App A and App C are deployed to the container application Interstage installed on the application server App 2. Since the Interstage of the application server App 1 and the Interstage of the application server App 2 match in container application name, they are multiplexed applications. In the application server App 1, the deployed application App B is deployed for another purpose. In the application server App 2, the deployed application App C is deployed for another purpose. In this state, when a method for detecting a multiplexed application is used based on the deployed application name, the deployed application names do not match, thereby failing in detecting Interstage of the appropriate and the Interstage of the application server App 2 as multiplexed applications. However, as illustrated in FIGS. 10 and 11, according to the transaction context or the transaction information of the application servers App 1 and App 2, it can be detected that only the deployed application App A is a multiplexed deployed application.

Figure 10:
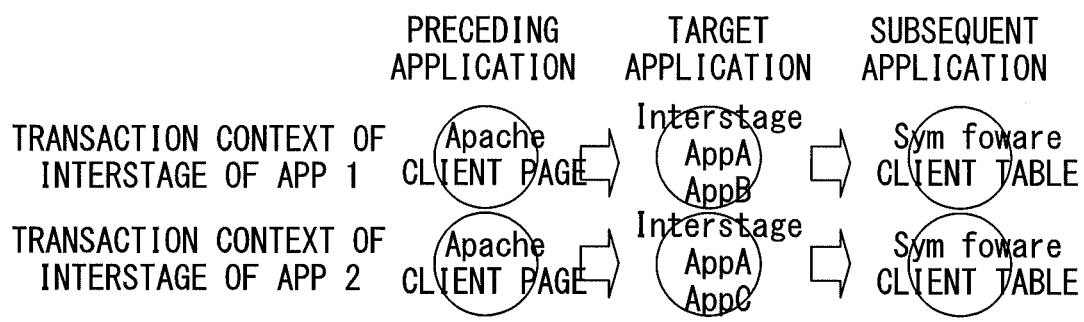
FIG. 10 is an explanatory view of detecting a multiplexed application using the detection of partially matching applications by transaction context.

FIG. 10 is an explanatory view of detecting a partially matching application by the transaction context in the device E. A plurality of container applications Interstage whose preceding application is a container application Apache having a client page and whose subsequent application is a container application Symfoware having a client table are detected. These container applications Interstage are multiplexed applications because the preceding application is the same as the subsequent application. Then, it can be detected that the deployed applications App A commonly deployed to all Interstage determined as multiplexed applications are multiplexed applications, and other deployed applications App B and App C are applications for other purposes.

Figure 11:
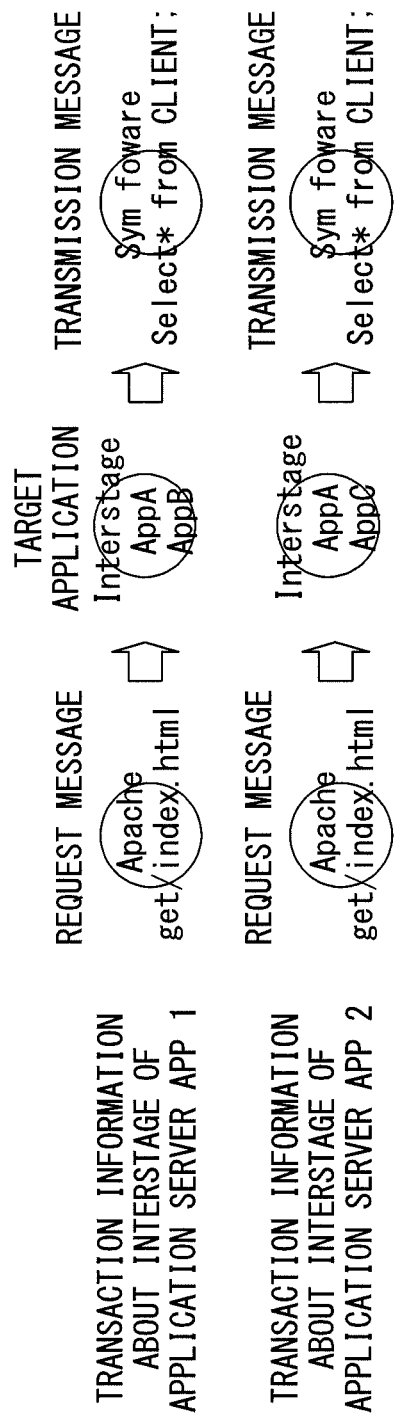
FIG. 11 is an explanatory view of detecting partially matching applications according to transaction information.

FIG. 11 is an explanatory view of detecting a partially matching application according to the transaction information in the device E. Interstage of the application servers App 1 and App 2 receive a request from Apache having index.html, and refers to the client table of Symfoware. Therefore, it is known according to the transaction context that the Interstage of the application server App 1 and Interstage of application server App 2 are multiplexed applications. Furthermore, a multiplexed application is detected from the deployed application App A commonly deployed to the application servers App 1 and App 2, and it is detected that the deployed applications App B and App C are applications for other purposes.

Figure 12:
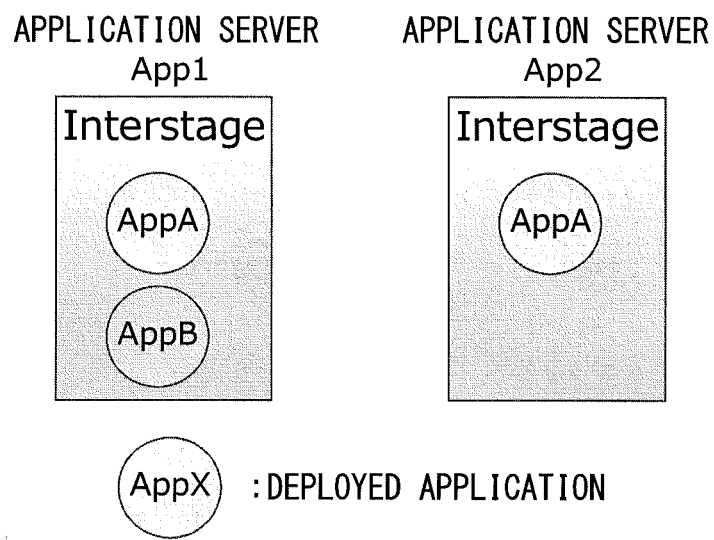
FIG. 12 is an example in which application names indicate inclusive relation.

Described next in FIG. 12 is an application of an inclusive relation. FIG. 12 illustrates the application servers App 1 and App 2, and the deployed applications App A and App B are deployed to the container application Interstage installed on the application server App 1. Only the deployed application App A is deployed to the container application Interstage installed on the application server App 1. As in the case illustrated in FIG. 9, Interstage of the application server App 1 and Interstage of the application server App 2 are multiplexed applications, but the deployed application App B of only the application server App 1 is deployed for another purpose. In this state, if the method of detecting the multiplexed application based on a deployed application name is used, the deployed application name does not match as in the case illustrated in FIG. 9. Therefore, Interstage of the application server App 1 and Interstage of the application server App 2 cannot be detected as multiplexed applications. However, according to the transaction context or transaction information of the application servers App 1 and App 2, it can be detected that only the deployed application App A is a multiplexed deployed application.

Figure 13:
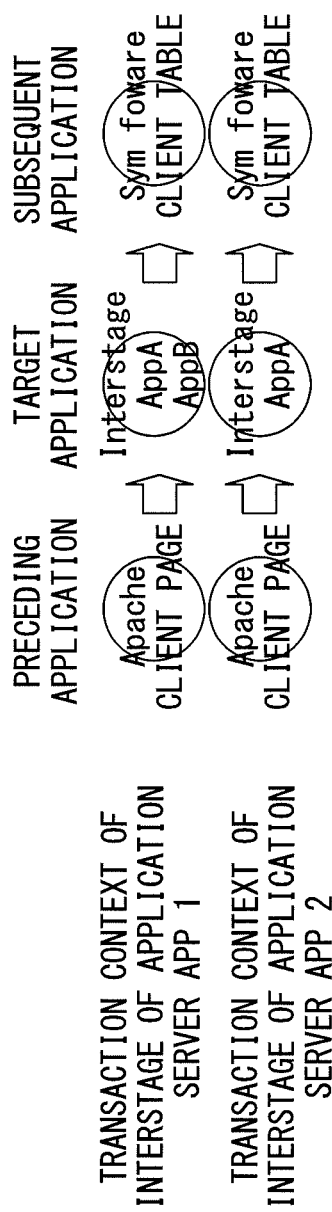
FIG. 13 is an explanatory view of detecting an inclusive application by transaction context.

FIG. 13 is an explanatory view of detecting an inclusive application by the transaction context in the device E. As in the case illustrated in FIG. 11, detected are a plurality of container applications Interstage whose preceding application is a container application Apache having a client page and whose subsequent application is a container application Symfoware having a client table. Thus, it is known that these container applications Interstage are multiplexed applications. As a result, it is detected that the deployed application App A commonly deployed to all Interstage determined as a multiplexed application is a multiplexed application, and other deployed applications App B are applications for other purposes.

Figure 14:
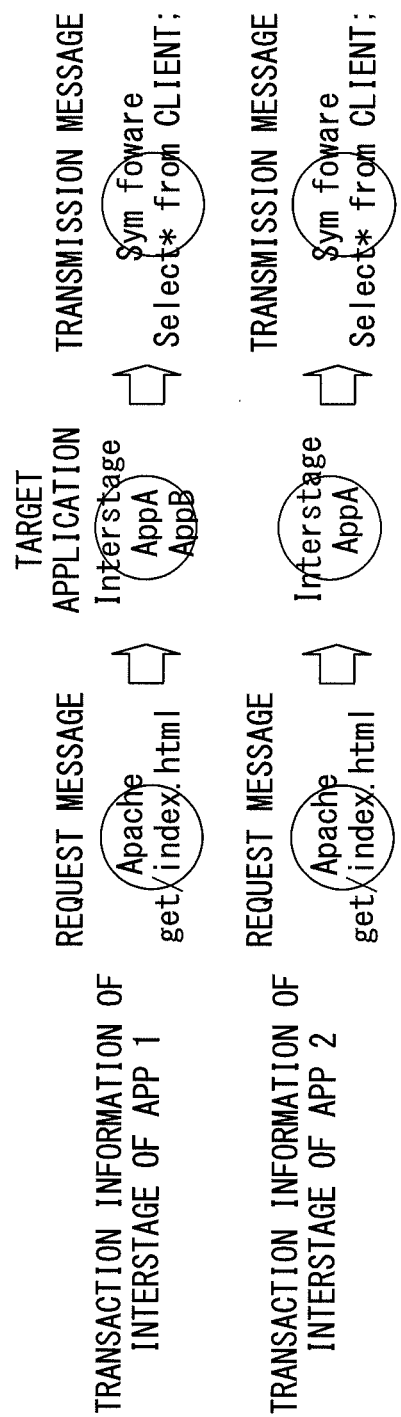
FIG. 14 is an explanatory view of detecting a multiplexed application using the detection of an inclusive application according to transaction information.

FIG. 14 is an explanatory view of detecting an inclusive application according to the transaction information in the device E. Interstage of the application servers App 1 and App 2 receive a request from Apache having index.html, and refers to the client table of Symfoware. Therefore, it is known that Interstage of the application server App 1 and Interstage of the application server App 2 are multiplexed applications. Furthermore, it can be detected that only the deployed application App A commonly deployed to the application servers App 1 and App 2 is a multiplexed application, and the deployed application App B is an application for another purpose.

There is an application of a triangular relation in addition to the above-mentioned partially matching application and an inclusive application. For example, it is the case in which deployed applications App A and App B are deployed to the application server App 1, deployed applications App B and App C are deployed to the application server App 2, and the deployed applications App C and App A are deployed to the application server App 3. In this case, each of the deployed applications App A, App B, and App C is a separate multiplexed application. In this case, the transaction context or transaction information matches in the device E, and a multiplexed application can be detected by combining applications having matching application names.

By the above-mentioned basic concept to realize the embodiments, the relationship between the transactions can be automatically detected by combining an application name, a subnet, transaction context, and transaction information.

As a result, when a part of the multiplexed application stops, an alert for the corresponding state can be raised and set. Therefore, a countermeasure can be selected by an operation manager depending on the seriousness of the current fault.

In addition, since a number of multiplexing methods can be used, a product for detecting a multiplexed application can be used although a multiplexing method has already been introduced to an existing IT system.

Described below is an embodiment of implementing the functions of the above-mentioned devices A through E.

Figure 15:
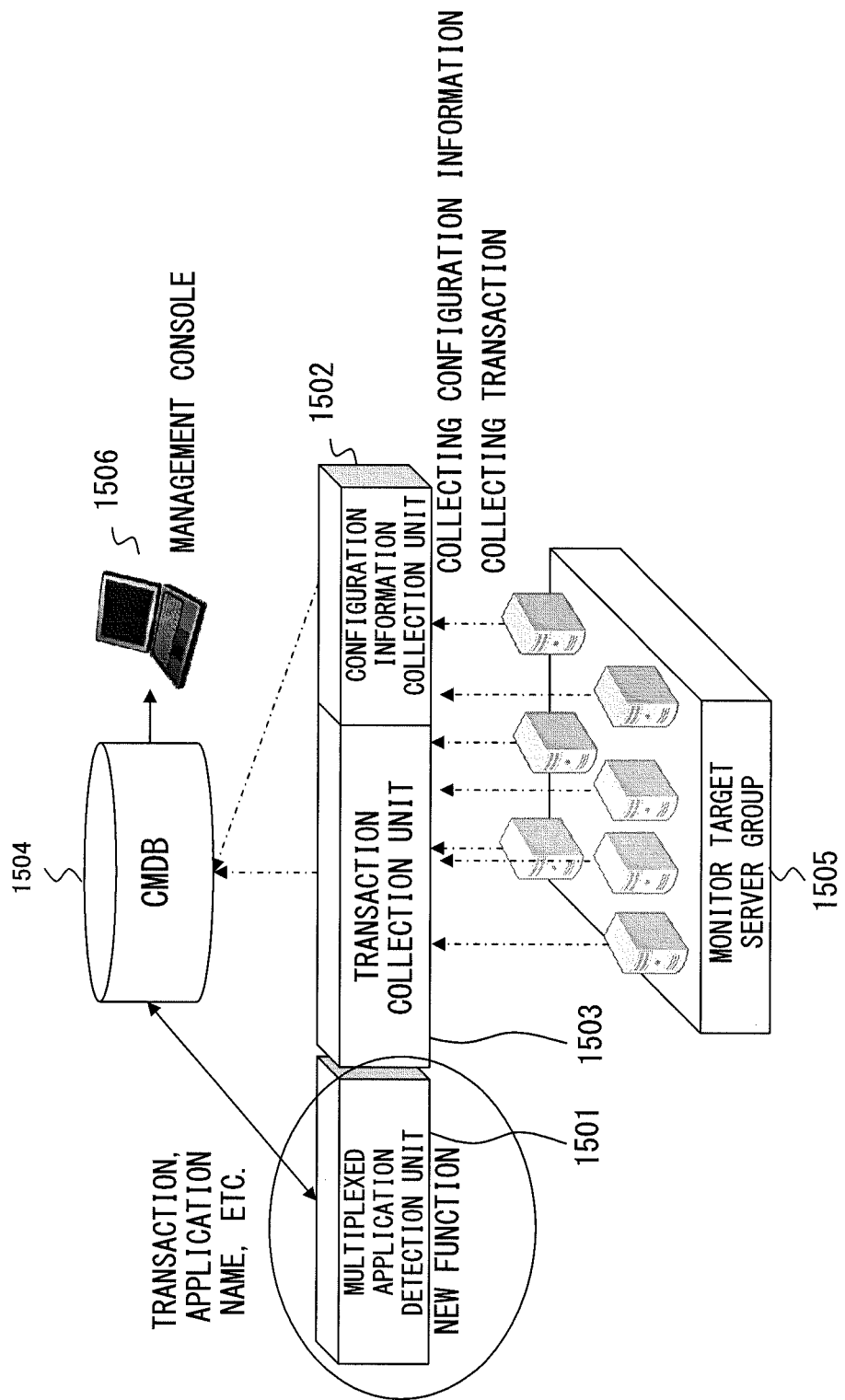
FIG. 15 is a configuration of a function according to an embodiment of the present invention.

FIG. 15 is the configuration of the function according to an embodiment of an IT system of an application management system. The system includes a multiplexed application detection unit 1501, a configuration information collection unit 1502, a transaction collection unit 1503, a CMDB 1504, and a management console 1506 for a monitor target server group 1505 configuring the IT system.

The configuration information collection unit 1502 collects the configuration information about the monitor target server group 1505, and stores the information in the CMDB 1504.

The transaction collection unit 1503 copies and collects the transaction information communicated on the monitor target server group 1505, and stores the information on the CMDB 1504.

The multiplexed application detection unit 1501 implements a new function according to the present embodiment, refers to the transaction information and the configuration information stored in the CMDB 1504, and detects a multiplexed application.

The management console 1506 can arbitrarily refer to the stored contents and display an appropriate alert according to the information about the multiplexed application detected by the multiplexed application detection unit 1501.

Figure 16:
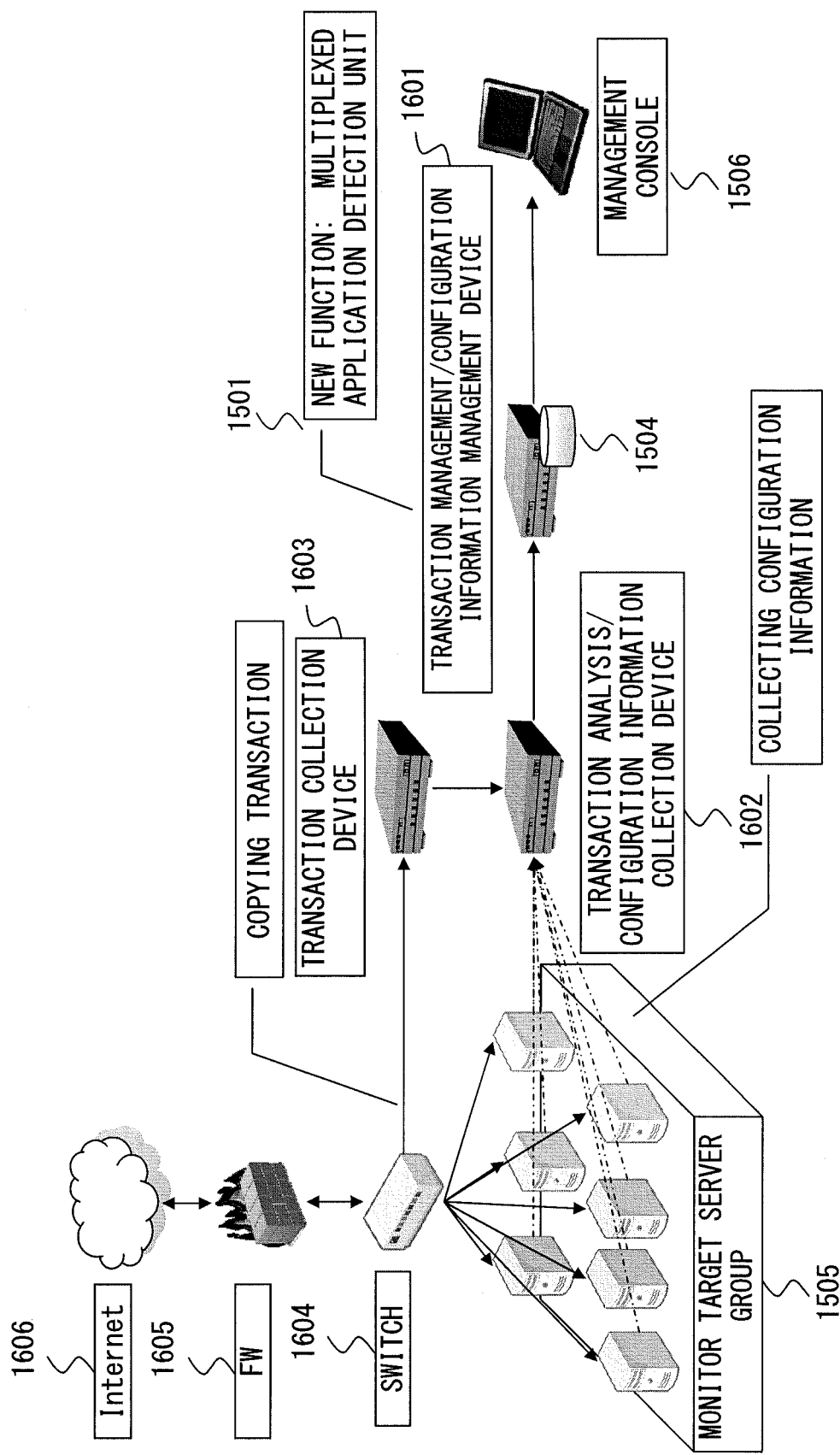
FIG. 16 is a configuration of a system according to an embodiment of the present invention.

FIG. 16 is a configuration of the system according to the embodiment of the IT system application management system implemented with the configuration of the function illustrated in FIG. 15. The system implements a transaction management/configuration information management device 1601, a transaction analysis/configuration information collection device 1602, a transaction collection device 1603, a switch 1604, and a firewall 1605.

The transaction management/configuration information management device 1601 implements the function of the CMDB 1504 in FIG. 15, and implements the function of the multiplexed application detection unit 1501 in FIG. 15.

the transaction analysis/configuration information collection device 1602 implements the function of the configuration information collection unit 1502 in FIG. 15.

The transaction collection device 1603 implements the function of the transaction collection unit 1503 in FIG. 15.

The monitor target server group 1505 (FIG. 15) is connected to the Internet 1606 through the firewall 1605.

The system configuration illustrated in FIG. 16 is an example, and the function of the multiplexed application detection unit 1501 in FIG. 15 can be implemented in the transaction analysis/configuration information collection device 1602 or the transaction collection device 1603.

FIG. 17 is a flowchart of the entire process of realizing by a computer the configuration of the function in FIG. 15 implemented by the system configuration in FIG. 16.

First, the configuration information is collected from the monitor target server group 1505 on the IT system as the function of the configuration information collection unit 1502, and stored in the CMDB 1504 (step S1701).

Next, the transaction information communicated on the monitor target server group 1505 is collected as the function of the transaction collection unit 1503, and stored in the CMDB 1504 (step S1702).

Next, a multiplexed application is detected from the container application, the deployed application, the transaction information, and the transaction context in the CMDB 1504 as the function of the multiplexed application detection unit

1501 (step S1703). This realizes a new function 1 according to an embodiment of the present invention.

Next, the IT services of multiplexed relations including multiplexed applications are combined into one as the function of the multiplexed application detection unit 1501 (step S1704). This realizes the second embodiment (multiplexed relation information service detection unit).

Next, the operation state of the IT service including the states of configuration information, a transaction, and a multiplexed application are displayed on the display device etc. of the management console 1506 as the function of the management console 1506 (step S1705).

Furthermore, the collected data is analyzed, and if it violates a preset SLA (service level agreement), an alert is raised. However, when trouble occurs at a level at which the IT service can continue, control is performed to lower the level of the alert or the like (step S1706). This realizes the third embodiment (alert output unit based on a multiplexed relation).

The processes in steps S1701 through S1706 are repeatedly performed (steps S1706→S1701).

The processes above have the following effects.

The multiplexed relation of applications can be automatically detected by combining an application name, a subnet, a transaction context, and transaction information.

When a part of multiplexed applications stop, an alert can be raised depending on the state. Therefore, an operation manager can select a countermeasure depending on the seriousness of a fault.

To correspond to a number of multiplexing methods, a product for detecting a multiplexed application can be used although a multiplexing method is introduced to an existing IT system.

FIG. 18 is an explanatory view of the difference between an example of a conventional alert notification and an example of an alert notification when a multiplexed application is detected according to the present embodiment. Conventionally, at a request from a Web server user, the process of a Web server, an application server, and a database server can cooperatively send a response to the user as one IT service (or an application), and display the operation state of the IT service on a management console. Service A and Service B in FIG. 18 indicate IT services, and they have multiplexed relations to each other. Assume that a part of the applications configuring Service A and Service B are multiplexed applications. In this environment, the IT service can continue if Service A is operated although Service B stops.

In the conventional management console product, when Service B (IT service B) stops, a notification of an alert that the service has stopped is issued although multiplexed Service A is operated as illustrated in FIG. 18(*a*).

Figure 19:
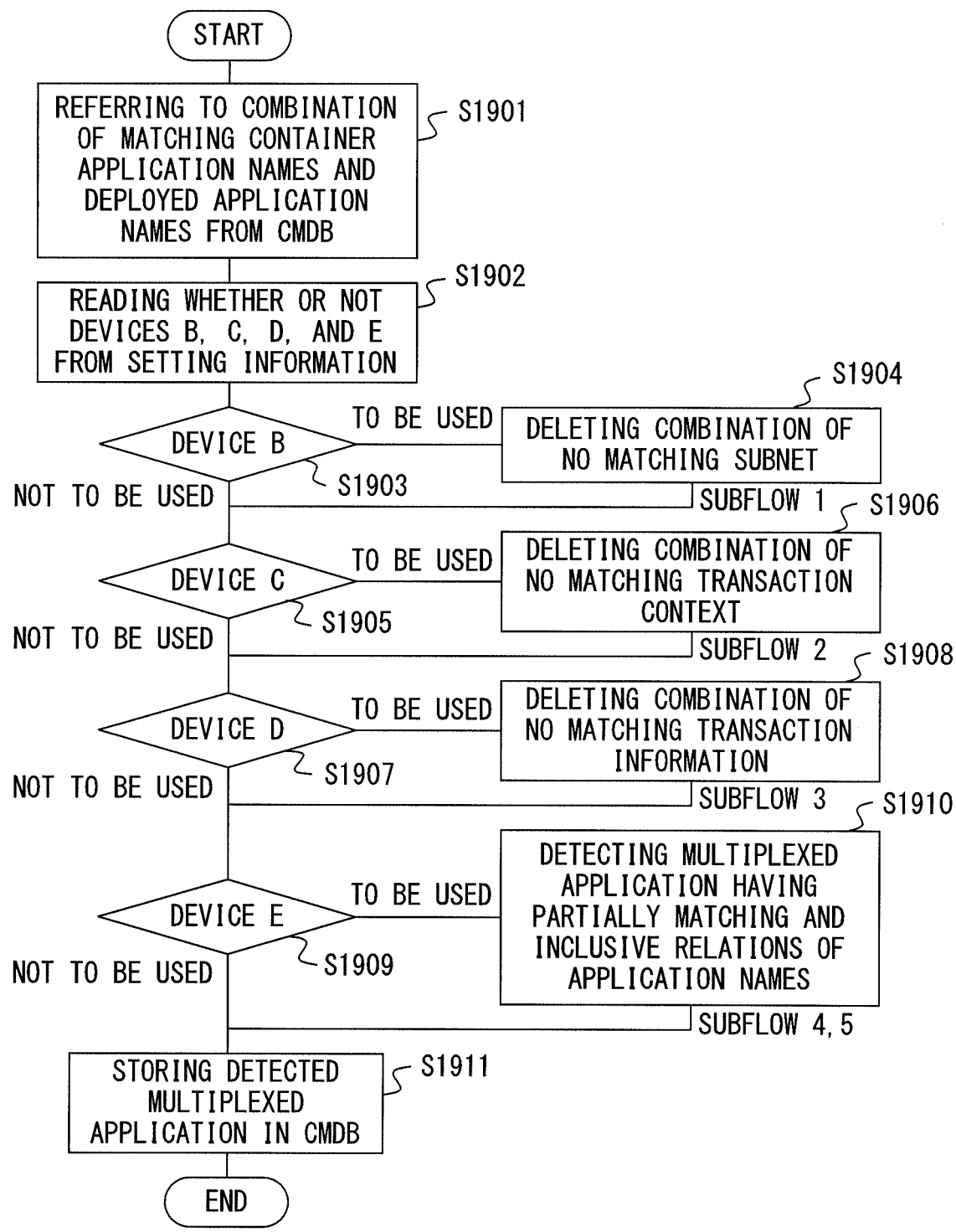
FIG. 19 is a flowchart of the entire process of the first embodiment of the present invention.

On the other hand, when a multiplexed application is detected in the new function of the present embodiment, the IT services can be grouped and displayed, and when only a part of them stop, the alert level of a notification can be lowered as illustrated in FIG. 18(*b*). Furthermore, the point of the problem can be checked in detail, and the stop of Service B and the operable state of Service A can be confirmed. FIG. 19 is a flowchart of the entire process of the computer according to the first embodiment in step S1703 illustrated in FIG. 17.

In FIG. 19, which function of the devices B, C, D, and E is to be used in steps S1903, S1905, S1907, and S1909 is determined by a person who monitors the IT service, and the determination result is set in the system. When the configuration of the IT system is changed, a device to be used is also changed.

As an example of the monitor target server group 1505 illustrated in FIG. 15 or 16, the IT system in FIG. 4, the case of monitoring the IT system as illustrated in FIG. 4 is described in detail with reference to the flowchart in FIG. 19.

First, the combination (candidate group for multiplexed applications) of applications having matching container application names and deployed application names is referenced from the CMDB 1504 (step S1901). FIG. 20 is an example of a data configuration of a candidate for a multiplexed application. There are a plurality of candidates for multiplexed applications for each application having matching container application name and deployed application name. In the CMDB 1504, each container application is managed in a data unit of Instance CI. The CI is short for configuration item. Each Instance CI is assigned Instance ID as an identifier. In FIG. 20, the entry indicated by each Instance ID of Ins 1, Ins 2, Ins 3, and Ins 4 matches in container application name and deployed application name. Therefore, it is determined as a candidate for a multiplexed application. Next, which device is to be used, the device B, C, D, or E, is read from the setting information not specifically illustrated in the attached drawings (step S1902).

Next, it is determined whether or not the device B is to be used (step S1903).

If it is determined that the device B is to be used, a candidate having no matching subnet in the candidate group for multiplexed applications obtained in step S1901 is excluded (step S1904). The subflow 1 as a detailed process in step S1904 is described later with reference to FIGS. 21 and 22.

If it is determined in step S1903 that the device B is not to be used, or after step S1904, it is determined whether or not the device C is to be used (step S1905).

If it is determined that the device C is to be used, the candidate having no matching transaction context in the candidate group for multiplexed applications obtained in step S1901 is excluded (step S1906). The subflow 2 as a detailed process in step S1906 is described later with reference to FIGS. 23 and 24.

If it is determined in step S1905 that the device C is not to be used, or after step S1906, it is determined whether or not the device D is to be used (step S1907).

If it is determined that the device D is to be used, the candidate having no matching transaction information in the candidate group for multiplexed applications obtained in step S1901 is excluded (step S1908). The subflow 3 as a detailed process in step S1908 is described later with reference to FIGS. 25 through 27.

If it is determined in step S1907 that the device D is not to be used, or after step S1908, it is determined whether or not the device E is to be used (step S1909).

If it is determined that the device E is to be used, a multiplexed application having a partially matching application name and an inclusive relation is detected (step S1910). The auxiliary procedure flow and the subflows 4 and 5 as the detailed process in step S1910 are described later with reference to FIGS. 28 through 38.

If it is determined that the device E is not to be used or after step S1910, the detected multiplexed application is stored in the CMDB 1504 (step S1911). The method of storing an application is assigning an ID for multi-identification generated as a common value to the entry of the deployed application or the container application of multiplexed relations to each other. Afterwards, the process of the flowchart in FIG. 19, that is, the process in display S1703 in FIG. 17 is completed.

Figure 21:
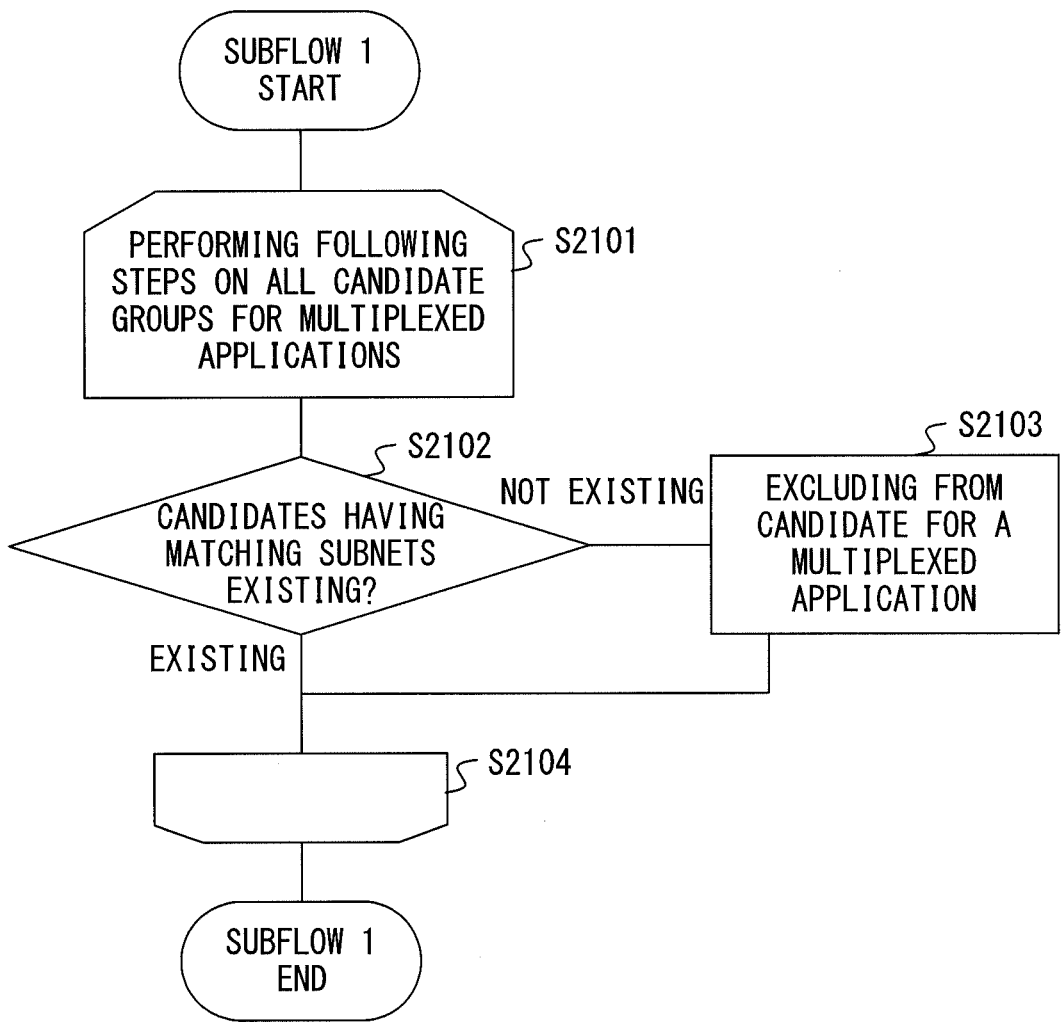
FIG. 21 is a subflow 1 of a filtering process by a subnet.

The details of the filtering process by the subnet in step S1904 in FIG. 19 are described below with reference to the subflow 1 in FIG. 21.

In this example, the following determination is repeatedly performed by the loop process from step S2101 to step S2104 on the candidate group for multiplexed applications obtained in step S1901 in FIG. 19. That is, in step S2102, it is determined whether or not there is a candidate having a matching subnet.

Each time it is determined in the repetition in step S2102 that there is no candidate having a matching subnet, a no-matching entry is excluded from the candidates for multiplexed applications (step S2103).

The above-mentioned candidate for a multiplexed application in, for example, FIG. 20 is considered. Process 1 (step S2102): The subnet address of each candidate is sequentially obtained from the top of the list by the logical product of the IP address and the subnet mask of each candidate. As a practical example, the subnet address of Ins 1=192.168.0.0 && 255.255.255.0=192.168.0.0. Similarly, Ins 2 and Ins 3=192.168.0.0, Ins 4=192.168.1.0.

Pross 2 (step S2102): Another candidate is compared in order from the top until a candidate having a matching subnet address is detected. If a matching candidate is detected, control is passed to the next loop in step S2104. If no matching calculation is detected, control is passed to step S2103. As a practical example, in the case of Ins 1, Ins 2 is compared with a subnet address. Since the subnet addresses are 192.168.0.0, control is passed to the next loop. In the case of Ins 2 and Ins 3, when the comparison is performed in order from the top, the subnet address matches with the initial Ins 1, control is passed to the next loop. On the other hand, since Ins 4 does not match the subnet address with Ins 1, Ins 2, and Ins 3, control is passed to step S2103.

Process 3 (step S2103): A corresponding candidate is excluded. As a practical example, Ins 4 is excluded from the candidates for multiplexed applications, and control is passed to step S2104.

Figure 22:
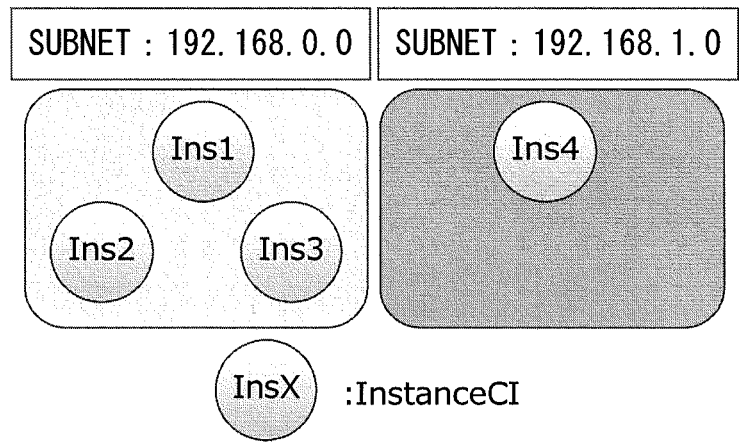
FIG. 22 is an explanatory view of a filtering process by a subnet.

As a result of the process above, since the subnet is 192.168.0.0 only in Ins 4 in FIG. 22, it is excluded from the candidates for multiplexed applications in FIG. 20.

Thus, the targets to be processed in the subsequent processes can be decreases. The access to the CMDB 1504 in the subsequent procedure can be reduced, thereby preventing the degradation of performance when there is a large amount of data.

Figure 23:
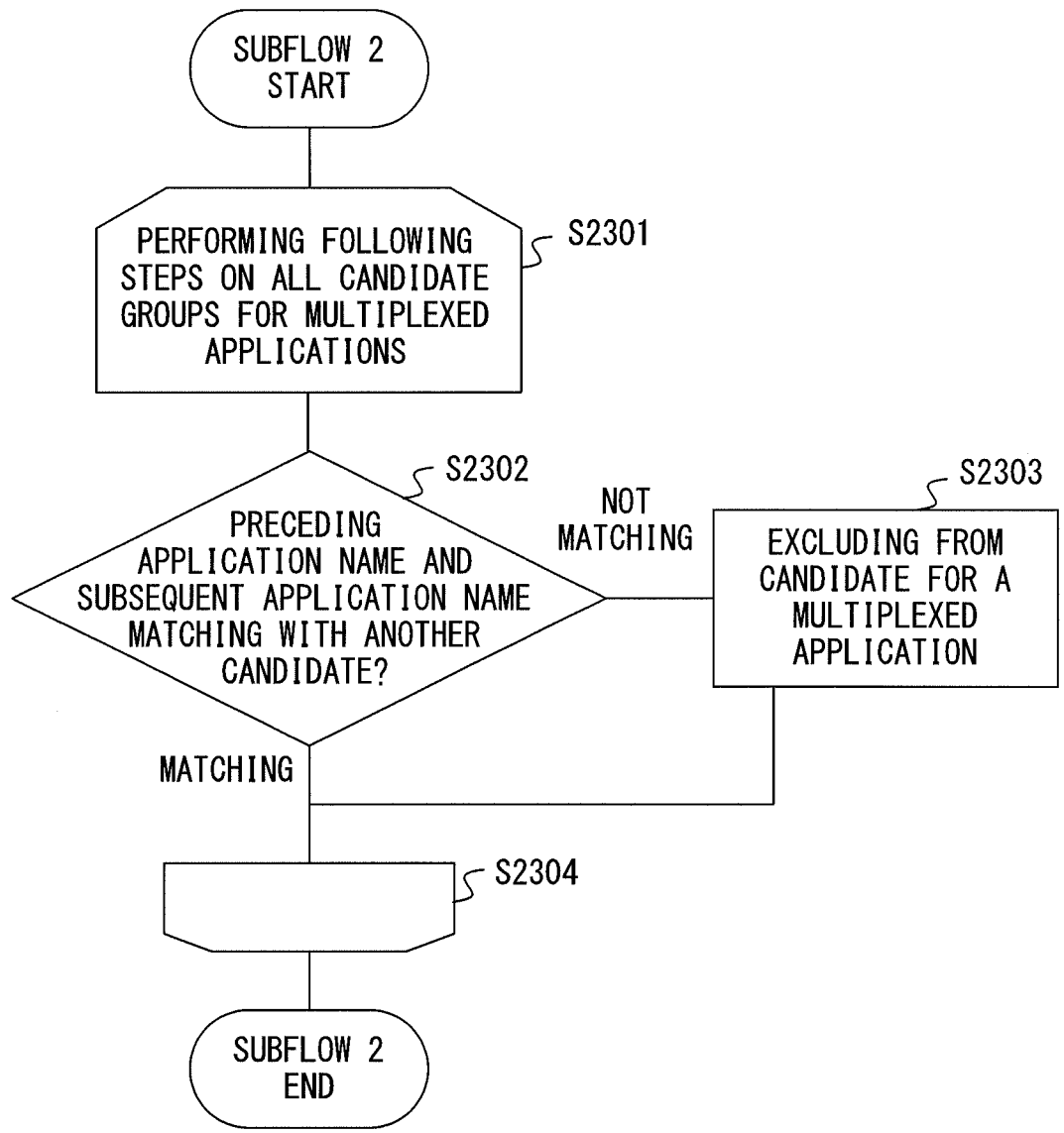
FIG. 23 is a subflow 2 of a filtering process by transaction context.

Next, the filtering process by the transaction context in step S1906 in FIG. 19 is described below in detail with reference to the subflow 2 in FIG. 23.

In this example, the following determination is repeatedly performed in the loop process from step S2301 to step S2304 on the candidate group for multiplexed applications obtained in step S1901 in FIG. 19. That is, in step S2302, it is determined whether or not the preceding application name and the subsequent application name match with another candidate.

Then, in repeating the process in step S2302, each time it is determined that there is no matching candidate, the no-matching entry is excluded from the candidates for multiplexed applications (step S2303).

For the candidate for a multiplexed application in FIG. 20, a transaction context is obtained as in the example of the data configuration in FIG. 24.

Process 1 (step S2302): In the data of the transaction context, a preceding application name and a subsequent application name are read in order from the top of the list. As a practical example, in Ins 1 and Ins 2, the preceding application is Apache and the subsequent application is Symfoware. In Ins 3, the preceding application is IIS, and the subsequent application is MySQL.

Process 2 (step S2302): It is evaluated whether or not the preceding application name and the subsequent application name match with other candidates. If a matching candidate is detected, control is passed to the next loop in step S2304. If no matching candidate is detected, control is passed to step S2303. As a practical example, Ins 1 and Ins 2 include matching preceding application and subsequent application, and control is passed to the next loop. Since Ins 3 includes no candidate having matching preceding application name and subsequent application name, control is passed to step S2303.

Process 3 (step S2303): A corresponding candidate is excluded. As a practical example, Ins 3 is excluded from the candidates for multiplexed applications, and control is passed to step S2304.

Process 4 (step S2304): When the process is completed on all candidates, it is terminated.

In the processes above, in FIG. 24, Ins 3 has a preceding application of IIS, and a subsequent application of MySQL. Therefore, the preceding and subsequent applications do not match with other candidates, and is excluded.

The application name can be a container application name or a deployed application name, and both container application name and deployed application name. If there is no application having a matching container application name other than a multiplexed application in the server to be monitored, a multiplexed application can be detected by a container application name only. Therefore, only a container application name can be normally used. However, in an environment in which there is an application having a matching container application name, it is necessary to use a deployed application name. Furthermore, in a specific operation mode in which there are different container applications, and only a deployed application is multiplexed, it is necessary to select a method of using a deployed application only. FIG. 24 is an example of only a container application name, but a more detailed comparison can be performed using a deployed application name.

Figure 25:
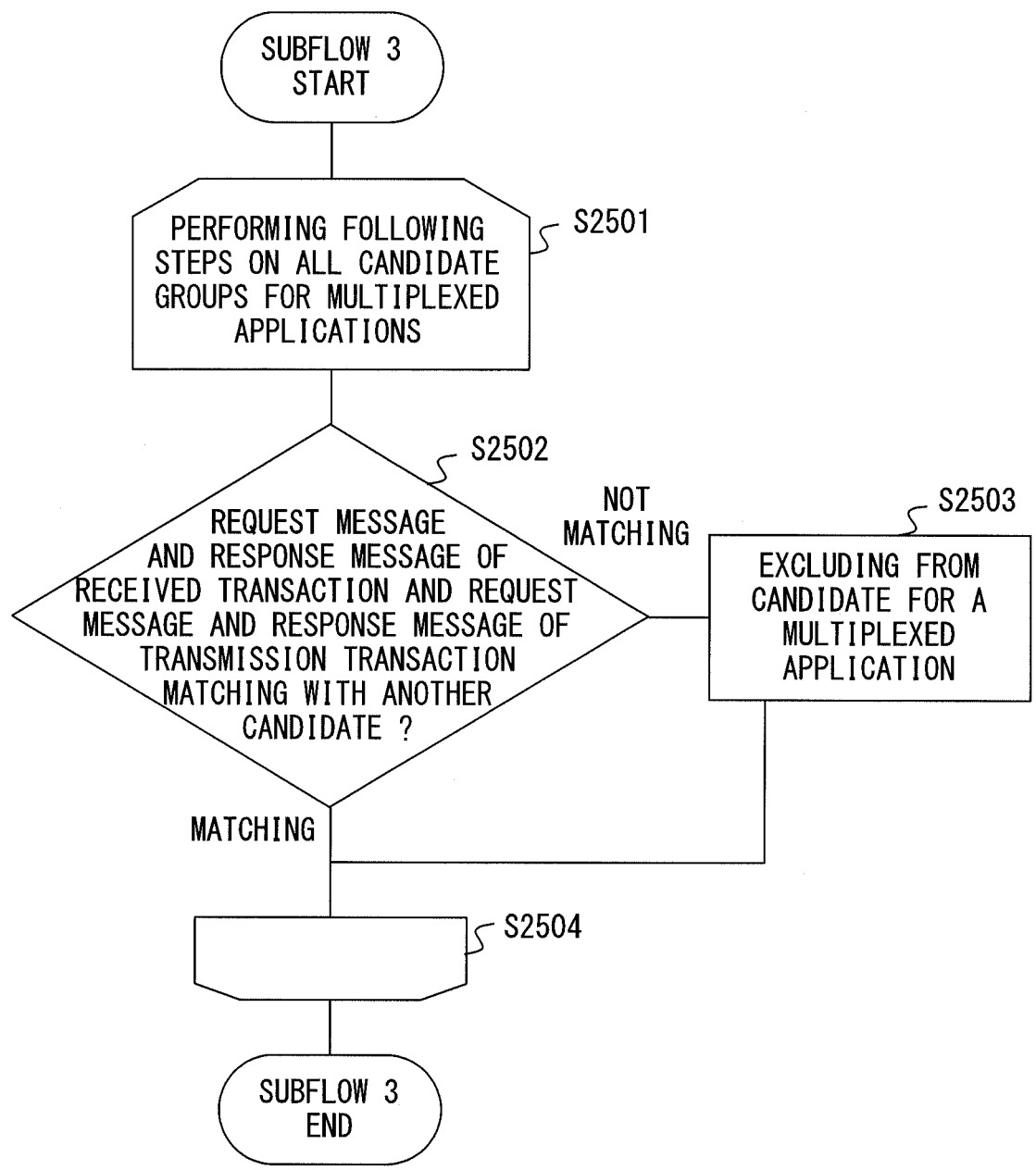
FIG. 25 is a subflow 3 of a filtering process according to transaction information.

The subflow 3 as a filtering process according to the transaction information in step S1908 in FIG. 19 is described below in detail with reference to the subflow 3 in FIG. 25.

In this example, the following determination is repeatedly performed by the loop process insteps S2501 through S2504 on a candidate group for multiplexed applications obtained in step S1901 in FIG. 19. That is, in step S2502, it is determined whether or not there is a matching candidate in request message and response message of other candidates and the received transaction, and request message and response message of the transmission transaction.

Then, in the repetition in step S2502, each time it is determined that there is no matching candidate, a non-matching entry is excluded from the candidates for multiplexed applications (step S2503).

The transaction information is obtained as in the data configuration example in FIG. 26 on the above-mentioned candidate for a multiplexed application in FIG. 20.

Process 1 (step S2502): In the data of the transaction information, a request message and a response message are read in order from the top of the list. As a practical example, in FIG. 26(a), in Ins 1 and Ins 2, the request message refers to the execution of App A in the received transaction, and the reference to client data in the transmission transaction. In addition, the response message refers to a client page in the received transaction, and client data in the transmission transaction. In Ins 3, the request message refers to the execution of App B in the received transaction, and the reference to the employee data in the transmission transaction. In addition, the response message refers to the employee page in the received transaction, and the employee data in the transmission transaction.

Process 2 (step S2502): It is evaluated whether or not transaction information matches with other candidates. If a matching candidate is detected, control is passed to the next loop in step S2504. If no matching candidate is detected, control is passed to step S2503. As a practical example, FIG. 26(b) illustrates the request message in FIG. 26(a) in detail. In FIG. 26(b), the character string written after "REQUEST" is a request message, and the character string written after "RESPONSE" is a response message. Since a transaction changes each time it is executed, only the variable name, for example, "execution of App A", "execution of App B", etc. of a parameter portion is checked, and the value itself is not included in a comparison target. It is determined whether or not the transaction information matches by comparing the character strings on each of the request message and the response message. For example, in Ins 1 and Ins 2, the request message and the response message match, control is passed to the next loop. In Ins 3, since there is no candidate having matching request message and response message, control is passed to step S2503.

Process 3 (step S2503): Corresponding candidates are excluded. As a practical example, Ins 3 is excluded from the candidates for multiplexed applications, and control is passed to step S2504.

Process 4 (step S2504): When the process is completed on all candidates, it is terminated.

Figure 27:
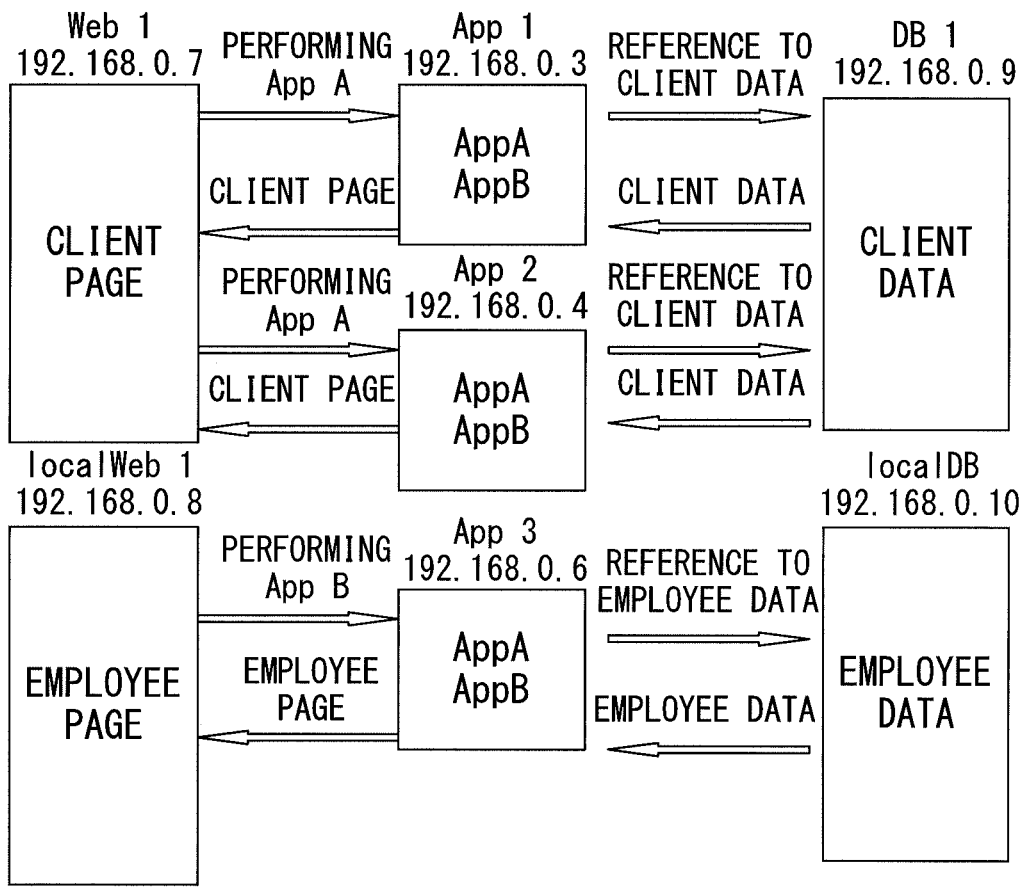
FIG. 27 is a specific explanatory view of a multiplexed application according to transaction information.

FIG. 27 is an explanatory view specific to a multiplexed application according to the transaction information. In the above-mentioned process, for example, on the application servers App 1 and App 2, since the received transactions match except the destination IP, and the transmission transactions match except the source IP (only the IP address of the local host is different), they are multiplexed applications. On the other hand, the application server App 3 includes received transactions and transmission transactions not matching other candidates. Therefore, it is excluded from the candidates for multiplexed applications.

Next, the process of detecting a multiplexed application whose application name in step S1910 in FIG. 19 partially matches or has inclusive relation is described in detail with reference to the flowchart in FIG. 28.

This auxiliary procedure is executed to detect a multiplexed application which cannot be detected by a matching application name. Normally, the configurations of a computer, a network, and an application are unified for multiplexing. Therefore, this procedure is executed when a specific case is to be detected.

Figure 28:
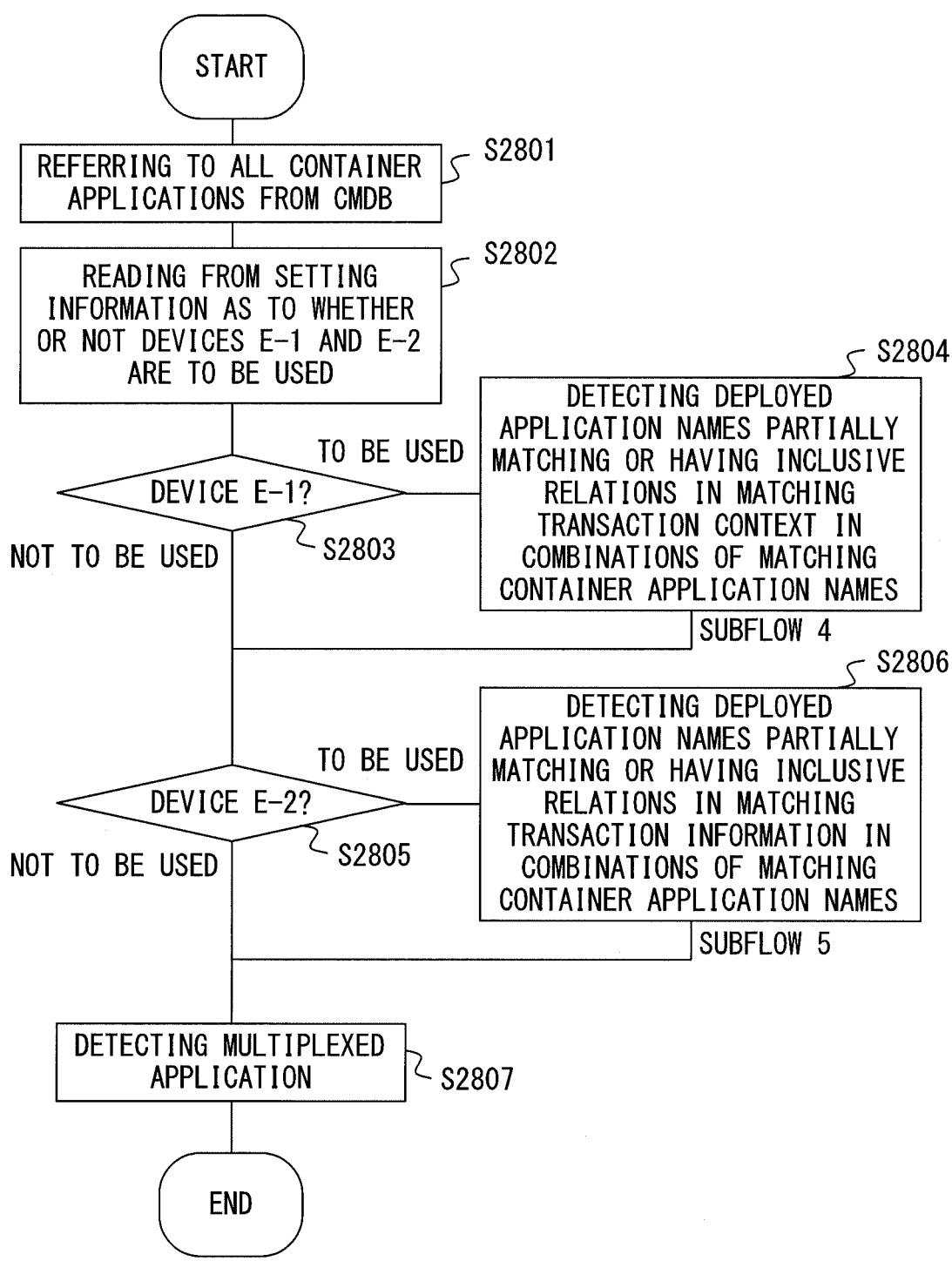
FIG. 28 is a flowchart of a filtering process using partially matching applications or an inclusive application.

In FIG. 28, which function to be used, the device E-1 or E-2 in steps S2803 and S2805, is determined by a person who monitors the IT service, and set in the system. When the configuration of the IT system is changed, the device to be used is also changed.

First, the configuration information collection unit 1502 refers to the combination of applications having matching container application names (step S2801).

Next, which device is to be used, a device E-1 or a device E-2, is read from the setting information not specifically illustrated in the attached drawings (step S2802).

Next, it is determined whether or not the device E-1 is to be used (step S2803).

If it is determined that the device E-1 is to be used, an application combination having matching transaction context and deployed application names partially matching or having inclusive relation is detected from among the combinations of applications having matching container application names obtained in step S2801 (step S2804).

When it is determined in step S2803 that the device E-1 is not used or after step S2804, it is determined whether or not the device E-2 is to be used (step S2805).

If it is determined that the device E-2 is to be used, an application combination having matching transaction information and deployed application names partially matching or having inclusive relation is detected from among the combinations of applications having matching container application names obtained in step S2801 (step S2806).

If it is determined in step S2805 that the device E is not to be used or after step S2806, the applications partially matching or having inclusive relation are detected as multiplexed applications (step S2807). Then, the process of the flowchart in FIG. 28, that is, the process in step S1910 in FIG. 19 is terminated.

Figure 29:
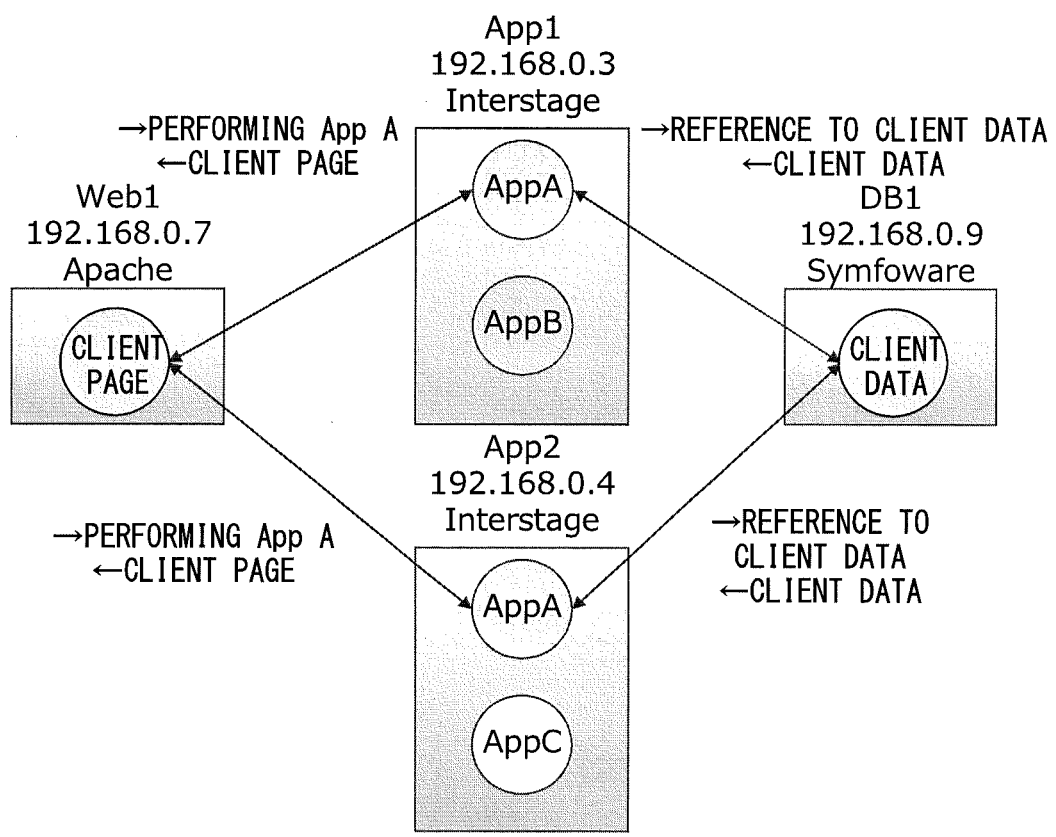
FIG. 29 is an example of detecting data of a multiplexed application in which application names partially match.

FIG. 29 is a schematic and explanatory view of the operation of detecting multiplexed applications having partially matching application names. With reference to FIG. 29, the multiplexed application candidate data (Instance CI), the transaction context data, and the transaction information data referenced in step S2801 (FIG. 28) are expressed by (a), (b), and (c) in FIG. 30 respectively. They respectively correspond to the data in FIGS. 20, 24, and 26. FIG. 29 illustrates transactions passing the servers having the host names of Web 1, App 1, DB 1 and Web 1, App 2, DB 1. In this case, the application servers App 1 and App 2 have only the deployed application App A multiplexed, and the deployed application App B is deployed for another purpose. FIG. 29 corresponds to FIGS. 9, 10 and 11 described above. According to the flowchart illustrated in FIG. 28, a multiplexed application is detected from the environment according to the transaction context or the transaction information.

FIG. 31 is a schematic and explanatory view of the operation of detecting multiplexed applications having application names of inclusive relation. With reference to FIG. 31, the multiplexed application candidate data (Instance CI), the transaction context data, and the transaction information data referenced in step S2801 (FIG. 28) are expressed by (a), (b), and (c) in FIG. 32 respectively. As with the case in FIG. 30, they respectively correspond to the data in FIGS. 20, 24, and 26. As with the case in FIG. 29, FIG. 31 illustrates transactions passing the servers having the host names of Web 1, App 1, DB 1 and Web 1, App 2, DB 1. In this case, the application servers App 1 and App 2 have only the deployed application App A multiplexed, and the deployed applications App B and App C are deployed for another purpose. FIG. 31 corresponds to FIGS. 12, 13, and 14 described above. According to the flowchart of the auxiliary procedure illustrated in FIG. 28, a multiplexed application is detected from the environment according to the transaction context or the transaction information.

Figure 33:
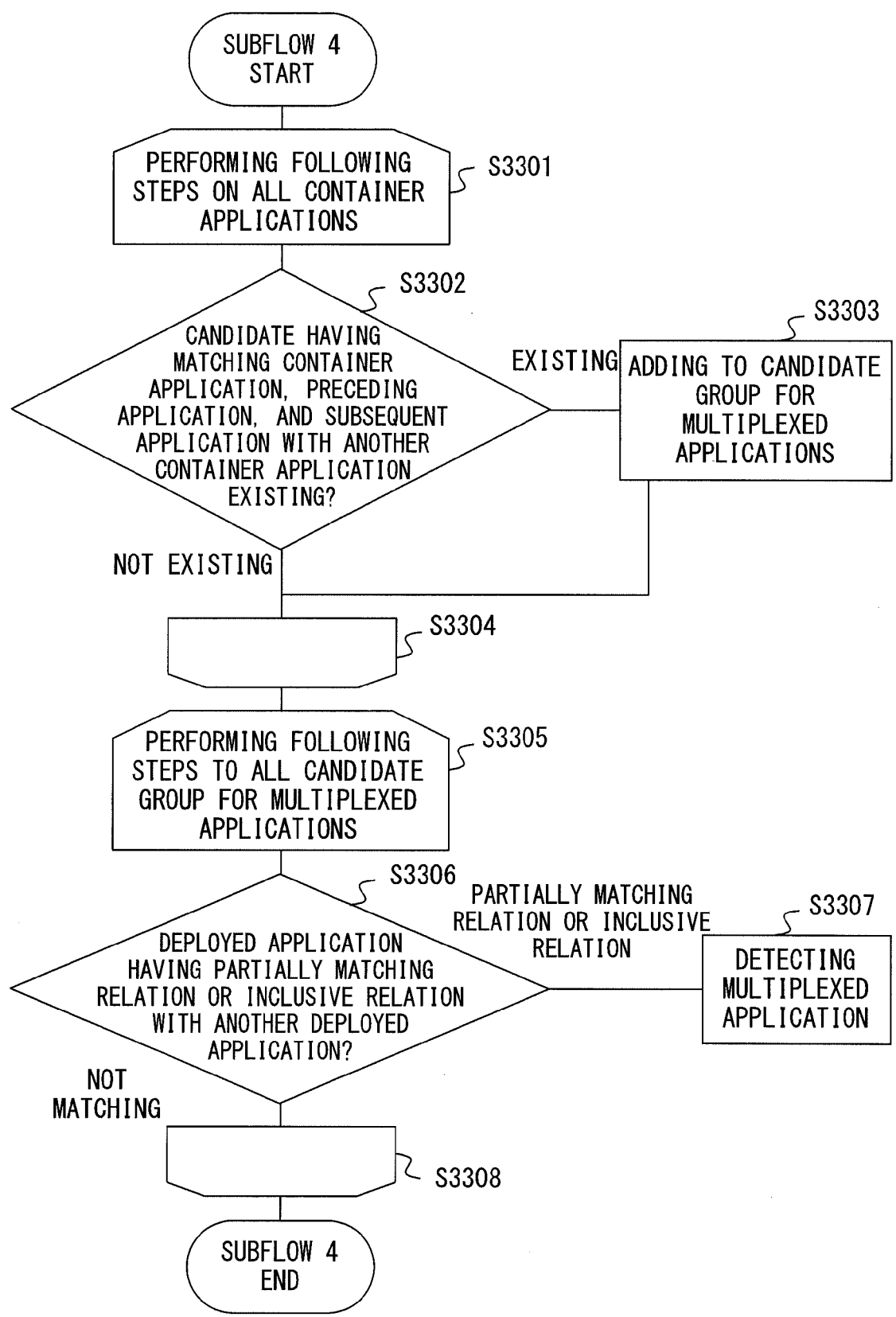
FIG. 33 is a subflow 4 of the process of detecting a partially matching application and an inclusive application by transaction context.

Next, the process of the device E-1 using the transaction context in step S2804 in FIG. 28 is described in detail with reference to the subflow 4 in FIG. 33.

In this example, the following determination is repeatedly performed by the loop process from step S3301 to step S3304 on the data obtained in step S2801 in FIG. 28. That is, in step S3302, it is determined whether or not there is a candidate whose preceding and subsequent applications of a container application match those of other container applications.

Then, in the repetition in step S3302, each time it is determined that a matching candidate is detected, a matching entry is added to candidates for multiplexed applications (step S3303).

Then, the following determination is repeatedly performed in the loop process from step S3305 to step S3308 on all candidate groups for multiplexed applications generated in the above-mentioned loop process. That is, in step S3306, it is determined whether or not a deployed application and another deployed application partially match or have inclusive relation.

Then, in the repetition in step S3306, each time a partially matching application or an application of inclusive relation is detected, an application having the relationships is detected as a multiplexed application (step S3307).

Consider an example of a data configuration of Instance CI in FIG. 30(a) having partially matching relation of FIG. 29 and transaction context in FIG. 30(b).

Process 1 (step S3302): The items of the lists of Instance CI and transaction context are sequentially read from the top. As a practical example, both on Ins 1 and Ins 2, obtained are the data indicating Apache for the preceding application, a client page for the deployed application of the preceding application, Interstage for the container application name, Symfoware for the subsequent application, and client data for the deployed application of the subsequent application. Only for the deployed application name, the data of deployed applications App A and App B of Ins 1, and the data of the deployed applications App A and App C of Ins 2 are obtained.

Process 2 (step S3302): It is evaluated whether or not there is a candidate having matching container applications, preceding applications, and subsequent applications. If no matching candidates are detected, control is passed to the next loop in step S3304. If a matching candidate is detected, control is passed to step S3303. As a practical example, when a matching candidate is detected on Ins 1, the container application, the preceding application, and the subsequent application match in Ins 2. Therefore, control is passed to step S3303.

Process 3 (step S3303): A corresponding candidate is added to a candidate group for multiplexed applications. As a practical example, Ins 1 is added to a group having the same container application, preceding application, and subsequent application. If there is no group, the group is generated. Then, control is passed to step S3304.

Process 4 (steps S3305 through S3306): The candidate group for multiplexed applications determined in the procedure above is sequentially read from the top. As a practical example, one group including Ins 1 and Ins 2 is generated. The group is sequentially read from the first Ins 1. If there is another group, the process 4 of the other group is performed after a plurality of the process 4 of the preceding group.

Process 5 (step S3306): It is evaluated whether or not another candidate and the deployed application partially match or have inclusive relations. If there is no corresponding candidate, control is passed to the next loop in step S3308. If a corresponding candidate is detected, control is passed to step S3307. As a practical example, Ins 1 has the deployed applications App A and App B. If a comparison is made with another candidate, it can be detected that Ins 2 has the deployed applications App A and App C, and only the deployed applications App A partially match. Since a partially matching candidate has been detected, control is passed to step S3307. Since similarly a partially matching candidate can be detected on Ins 2, control is passed to step S3307.

Process 6 (step S3307): A corresponding candidate is defined as a multiplexed application. As a practical example, Ins 1 and Ins 2 are registered as multiplexed applications.

Process 7 (step S3308): When the process is completed on all candidates, the process terminates.

By the processes above, for example, Instance CI in FIG. 30(a) and the transaction context in FIG. 30(b) are considered. In this case, the preceding application has a container application name of Apache and a deployed application name of a client page, and the subsequent application has a container application name of Symfoware and a deployed application name of client data. Therefore, the preceding application name and the subsequent application name match. When the application servers App 1 and App 2 are compared with each other, the container application names are Interstage and the deployed application names of App A are the same, but only the application server App 1 has the deployed application App B and only the application server App 2 has the deployed application App C. Therefore, the deployed application App A is an element of a multiplexed application and the deployed applications App B and App C are applications for other purposes.

Next, consider an example of a data configuration of Instance CI in FIG. 32(a) having inclusive relation of FIG. 31 and transaction context in FIG. 32(b).

Process 1 (step S3302): The items of the lists of Instance CI and transaction context are sequentially read from the top. As a practical example, both on Ins 1 and Ins 2, obtained are the data indicating Apache for the preceding application, a client page for the deployed application of the preceding application, Interstage for the container application name, Symfoware for the subsequent application, and client data for the deployed application of the subsequent application. Only for the deployed application name, the data of deployed applications App A and App B of Ins 1, and the data of the deployed application App A of Ins 2 are obtained.

Process 2 (step S3302): It is evaluated whether or not there is a candidate having matching container applications, preceding applications, and subsequent applications. If no matching candidates are detected, control is passed to the next loop in step S3304. If a matching candidate is detected, control is passed to step S3303. As a practical example, when a matching candidate is detected on Ins 1, the container application, the preceding application, and the subsequent application match in Ins 2. Therefore, control is passed to step S3303.

Process 3 (step S3303): A corresponding candidate is added to a candidate group for multiplexed applications. As a practical example, Ins 1 is added to a group having the same container application, preceding application, and subsequent application. If there is no group, the group is generated. Then, control is passed to step S3304.

Process 4 (steps S3305 through S3306): The candidate group for multiplexed applications determined in the procedure above is sequentially read from the top. As a practical example, one group including Ins 1 and Ins 2 is generated. The group is sequentially read from the first Ins 1. If there is another group, the process 4 of the other group is performed after a plurality of the process 4 of the preceding group.

Process 5 (step S3306): It is evaluated whether or not another candidate and the deployed application partially match or have inclusive relations. If there is no corresponding candidate, control is passed to the next loop in step S3308. If a corresponding candidate is detected, control is passed to step S3307. As a practical example, Ins 1 has the deployed applications App A and App B. If a comparison is made with another candidate, it can be detected that Ins 2 has the deployed application App A, and only the deployed applications App A partially match. Since a partially matching candidate has been detected, control is passed to step S3307. Since similarly a partially matching candidate can be detected on Ins 2, control is passed to step S3307.

Process 6 (step S3307): A corresponding candidate is defined as a multiplexed application. As a practical example, Ins 1 and Ins 2 are registered as multiplexed applications.

Process 7 (step S3308): When the process is completed on all candidates, the process terminates.

By the processes above, for example, Instance CI in FIG. 32(a) and the transaction context in FIG. 32(b) are considered. In this case, the preceding application has a container application name of Apache and a deployed application name of a client page, and the subsequent application has a container application name of Symfoware and a deployed application name of client data. Therefore, the preceding application name and the subsequent application name match. When the application servers App 1 and App 2 are compared with each other, the container application names are Interstage and the deployed application names of App A are the same, but only the application server App 1 has the deployed application App B. Therefore, the deployed application App A is an element of a multiplexed application and the deployed application App B is an application for other purpose.

Figure 34:
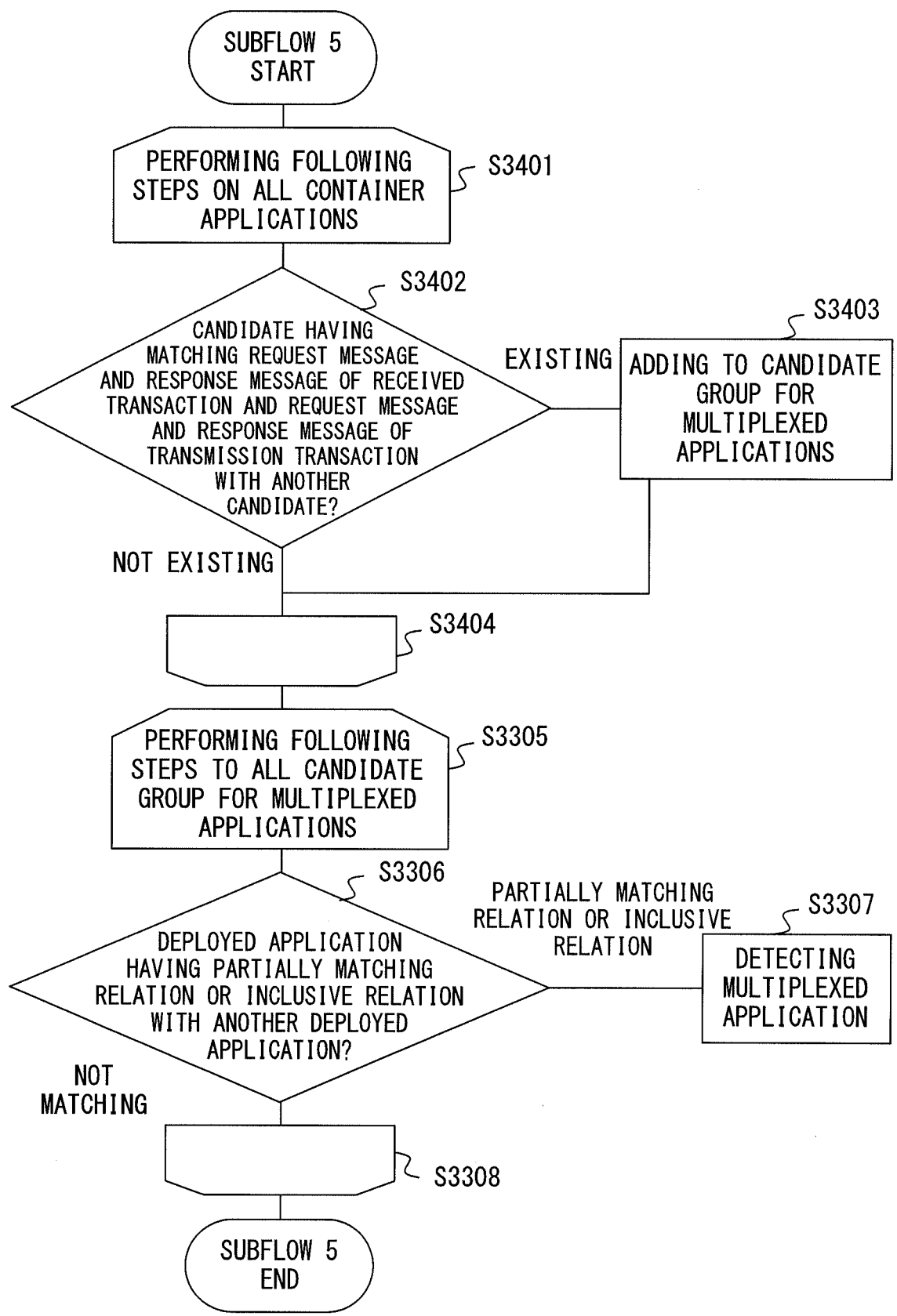
FIG. 34 is a subflow 5 of the process of detecting a partially matching application and an inclusive application according to transaction information.

Next, the process of the device E-2 using the transaction information in step S2806 in FIG. 28 is described in detail with reference to the subflow 4 in FIG. 34.

In this example, the following determination is repeatedly by the loop process from step S3401 to step S3404 on the data obtained in step S2801 in FIG. 28. That is, in step S3402, it is determined whether or not there is a candidate whose request message and response message of the received transaction match the request message and the response message of the transmission transaction.

Then, in the repetition in step S3402, each time it is determined that a matching candidate is detected, a matching entry is added to candidates for multiplexed applications (step S3403).

Then, the following determination is repeatedly performed in the loop process from step S3405 to step S3408 on all candidate groups for multiplexed applications generated in the above-mentioned loop process. That is, in step S3406, it is determined whether or not a deployed application and another deployed application partially match or have inclusive relation.

Then, in the repetition in step S3406, each time a partially matching application or an application of inclusive relation is detected, an application having the relationships is detected as a multiplexed application (step S3407).

Consider an example of a data configuration of Instance CI in FIG. 30(a) having partially matching relation of FIG. 29 and transaction information in FIG. 30(c).

Process 1 (step S3402): The items of the lists of Instance CI and transaction information are sequentially read from the top. As a practical example, data of container application name of Interstage can be retrieved for Ins 1 and Ins 2. Retrieved furthermore are the data of the execution of the deployed application App A in the request message, the reference of client data in the transmission transaction, a client page of the received transaction in the response message, and client data in the transmission transaction. Only for the deployed application name, the data of deployed applications App A and App B of Ins 1, and the data of the deployed applications App A and App C of Ins 2 are obtained.

Process 2 (step S3402): It is evaluated whether or not there is a candidate having matching request messages and response messages. If no matching candidates are detected, control is passed to the next loop in step S3404. If a matching candidate is detected, control is passed to step S3403. As a practical example, when a matching candidate is detected on Ins 1, the request messages and the response messages match in Ins 2. Therefore, control is passed to step S3403.

Process 3 (step S3403): A corresponding candidate is added to a candidate group for multiplexed applications. As a practical example, Ins 1 is added to a group having the same request message and response message. If there is no group, the group is generated. Then, control is passed to step S3404.

Process 4 (steps S3405 through S3406): The candidate group for multiplexed applications determined in the procedure above is sequentially read from the top. As a practical example, one group including Ins 1 and Ins 2 is generated. The group is sequentially read from the first Ins 1. If there is another group, the process 4 of the other group is performed after a plurality of the process 4 of the preceding group.

Process 5 (step S3406): It is evaluated whether or not another candidate and the deployed application partially match or have inclusive relations. If there is no corresponding candidate, control is passed to the next loop in step S3408. If a corresponding candidate is detected, control is passed to step S3407. As a practical example, Ins 1 has the deployed applications App A and App B. If a comparison is made with another candidate, it can be detected that Ins 2 has the deployed applications App A and App C, and only the deployed applications App A partially match. Since a partially matching candidate has been detected, control is passed to step S3407. Since similarly a partially matching candidate can be detected on Ins 2, control is passed to step S3407.

Process 6 (step S3407): A corresponding candidate is defined as a multiplexed application. As a practical example, Ins 1 and Ins 2 are registered as multiplexed applications.

Process 7 (step S3408): When the process is completed on all candidates, the process terminates.

By the processes above, for example, Instance CI in FIG. 30(a) and the transaction context in FIG. 30(c) are considered. In this case, Ins 1 and Ins 2 receive a request from the same IP address according to the transaction information, and refer to the table at the same destination IP, and therefore the request message and the response message match, thereby indicating multiplexed applications. Therefore, when the Instance CI is compared between Ins 1 and Ins 2, the deployed application App A is commonly deployed. Accordingly, it is a multiplexed application, and the deployed applications App B and App C are not multiplexed applications.

Consider an example of a data configuration of Instance CI in FIG. 32(a) having partially matching relation of FIG. 31 and transaction information in FIG. 32(c).

Process 1 (step S3402): The items of the lists of Instance CI and transaction information are sequentially read from the top. As a practical example, data of container application name of Interstage can be retrieved for Ins 1 and Ins 2. Retrieved furthermore are the data of the execution of the deployed application App A in the request message, the reference of client data in the transmission transaction, a client page of the received transaction in the response message, and client data in the transmission transaction. Only for the deployed application name, the data of deployed applications App A and App B of Ins 1, and the data of the deployed application App A of Ins 2 are obtained.

Process 2 (step S3402): It is evaluated whether or not there is a candidate having matching request messages and response messages. If no matching candidates are detected, control is passed to the next loop in step S3404. If a matching candidate is detected, control is passed to step S3403. As a practical example, when a matching candidate is detected on Ins 1, the request messages and the response messages match in Ins 2. Therefore, control is passed to step S3403.

Process 3 (step S3403): A corresponding candidate is added to a candidate group for multiplexed applications. As a practical example, Ins 1 is added to a group having the same request message and response message. If there is no group, the group is generated. Then, control is passed to step S3404.

Process 4 (steps S3405 through S3406): The candidate group for multiplexed applications determined in the procedure above is sequentially read from the top. As a practical example, one group including Ins 1 and Ins 2 is generated. The group is sequentially read from the first Ins 1. If there is another group, the process 4 of the other group is performed after a plurality of the process 4 of the preceding group.

Process 5 (step S3406): It is evaluated whether or not another candidate and the deployed application partially match or have inclusive relations. If there is no corresponding candidate, control is passed to the next loop in step S3408. If a corresponding candidate is detected, control is passed to step S3407. As a practical example, Ins 1 has the deployed applications App A and App B. If a comparison is made with another candidate, it can be detected that Ins 2 has the deployed application App A, and only the deployed applications App A partially match. Since a partially matching candidate has been detected, control is passed to step S3407. Since similarly a candidate having inclusive relation can be detected on Ins 2, control is passed to step S3407.

Process 6 (step S3407): A corresponding candidate is defined as a multiplexed application. As a practical example, Ins 1 and Ins 2 are registered as multiplexed applications.

Process 7 (step S3408): When the process is completed on all candidates, the process terminates.

By the processes above, for example, Instance CI in FIG. 32(*a*) and the transaction context in FIG. 32(*c*) are considered. In this case, Ins 1 and Ins 2 receive a request from the same IP address according to the transaction information, and refer to the table at the same destination IP, and therefore the request message and the response message match, thereby indicating multiplexed applications. Therefore, when the Instance CI is compared between Ins 1 and Ins 2, the deployed application App A is commonly deployed. Accordingly, it is a multiplexed application, and the deployed application App B is not multiplexed applications.

In the methods above, multiplexed applications whose deployed applications partially match or have inclusive relations can be detected.

Figure 35:
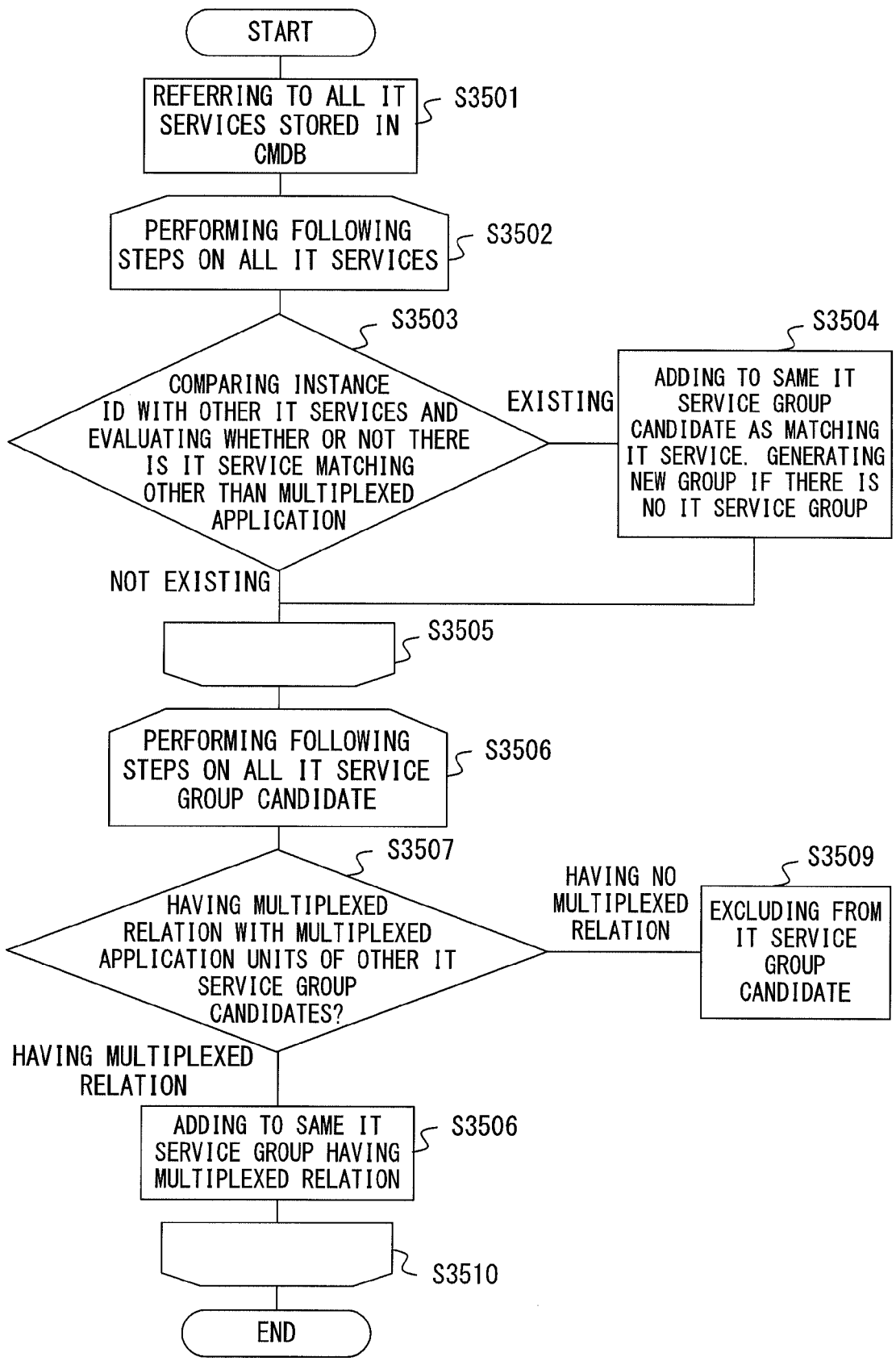
FIG. 35 is a flowchart of the process of the second embodiment of the present invention.

FIG. 35 is a flowchart of the process performed by the computer according to the second embodiment in step S1704.

First, all IT services registered in the CMDB 1504 are referenced (step S3501).

Figure 36:
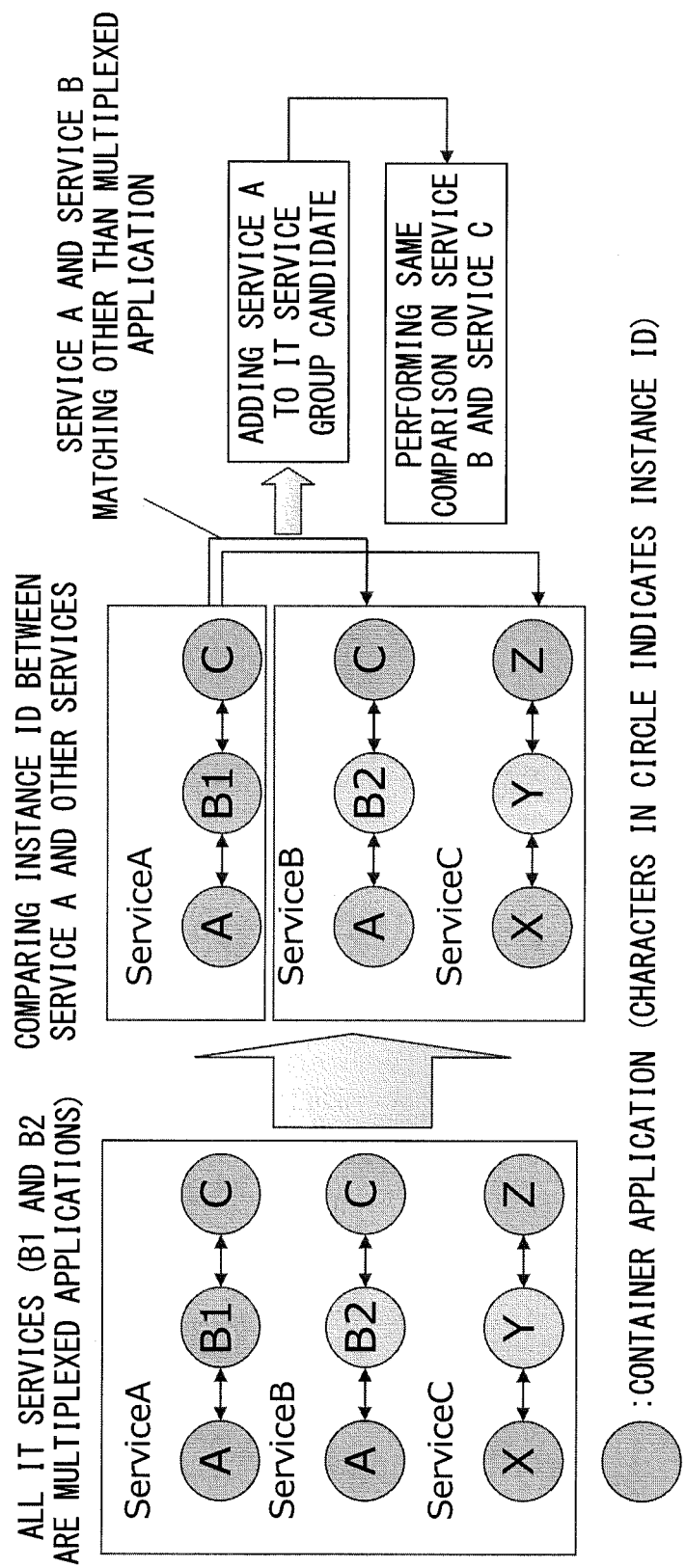
FIG. 36 is an explanatory view of the second embodiment of the present invention.

Next, the following determinations are repeatedly performed in the loop process from step S3502 to S3505 on all IT services obtained in step S3501. That is, in step S3503, Instance ID (FIG. 20) of an IT service to be processed is compared with that of another IT service. Thus, it is evaluated whether or not there is an IT service having matching applications other than multiplexed applications. In each of the IT service obtained in step S3501, as illustrated in FIG. 36, a chain of applications is expressed as a list of Instance ID corresponding to each application (FIG. 44 described later). Furthermore, the CMDB 1504 stores the record information about each application having each Instance ID as a key as illustrated in FIG. 20. The record information about each application stores the information about whether or not it is a multiplexed application and the information identifying a multiplexed application in step S1911 in FIG. 19 according to the first embodiment in step S1703 in FIG. 17. In step S3503, the record information is referenced, and it is evaluated whether or not the ID other than Instance ID corresponding to the multiplexed application match other IT services in the list of the Instance ID configuring the IT service to be processed.

As a result, when it is determined that there is a matching IT service, the IT service to be processed is added in step S3504 to the same IT service group candidate as the IT service group candidate to which the matching IT service belongs. If there is no IT service group candidate, a new group candidate is generated, and the IT service to be processed and the matching IT service are added to the new IT service group candidate. Assume that there are IT services Service A, Service B, and Service C as illustrated in FIG. 36. As a result of the above-mentioned loop process, Service A and Service B have matching preceding and subsequent applications A and C other than the multiplexed applications B1 and B2. Therefore, Service A is first added to the IT service group candidate to which Service B belongs. The same comparison is performed on Service B and Service C.

Then, the following determination is repeatedly performed by the loop process from step S3506 to S3510 on each IT service group candidate obtained in the above-mentioned loop process. That is, in step S3507, it is determined whether or not there is an IT service of multiplexed relation with a multiplexed application unit as another IT service group candidate.

As a result, when it is determined that there is an IT service of multiplexed relation the IT service group candidate to be processed is added to the same IT service group as an IT service of multiplexed relation (step S3508).

On the other hand, when it is determined that there is no IT service of multiplexed relation, it is excluded from the IT service group candidates (step S3509).

By the process above, the IT service of multiplexed relation including multiplexed applications are put together into one group. As a result, in step S1705 in FIG. 17, the alert display as illustrated in FIG. 18 is realized.

Figure 37:
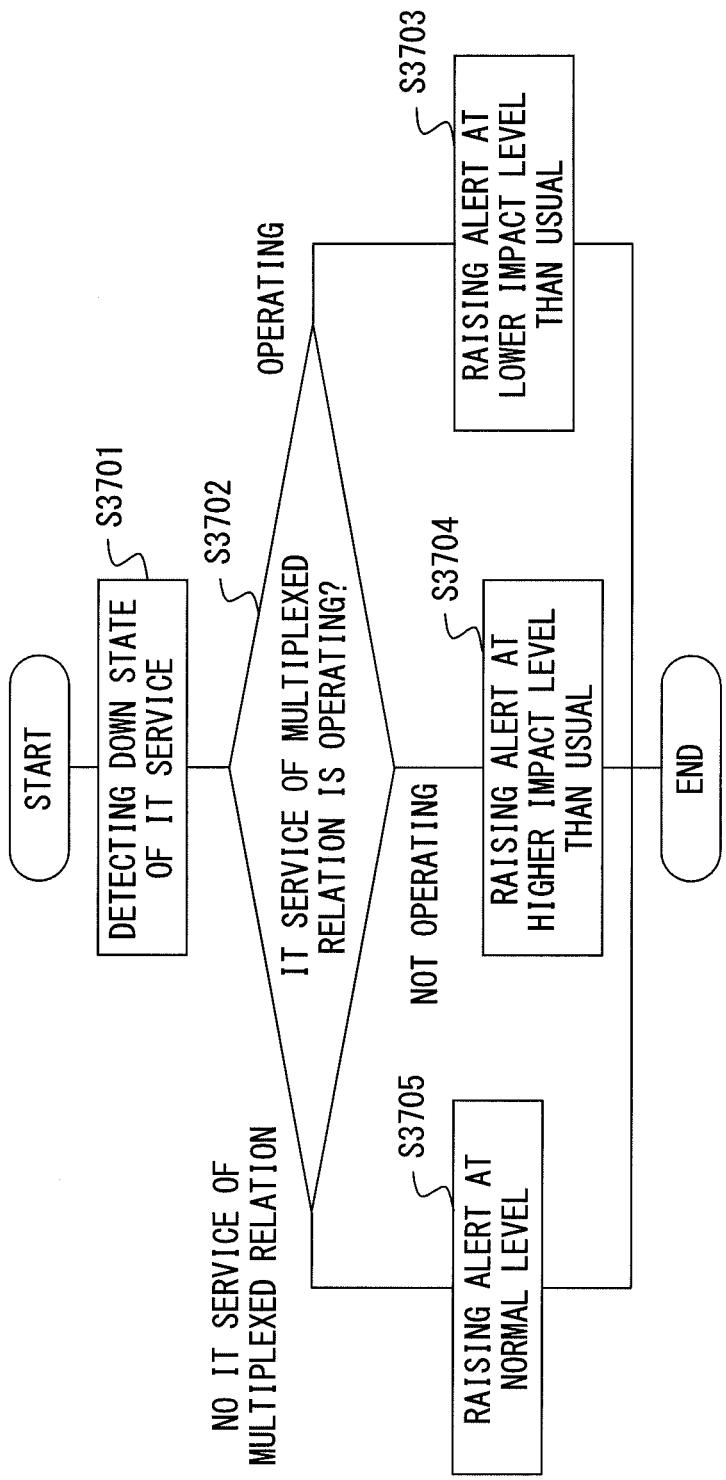
FIG. 37 is a flowchart of the process of the third embodiment of the present invention.

FIG. 37 is a flowchart of the process by the computer according to the third embodiment in step S1706 in FIG. 17.

First, as a result of the monitor of a normal IT system, the down state of an IT service is detected (step S3701).

Next, with reference to the CMDB 1504, it is determined on the IT service in which the down state is detected whether or not an IT service of multiplexed relation is operated. Whether or not an IT service has a multiplexed relation is detected as an IT service group according to the second embodiment illustrated by the flowchart in FIG. 35.

As a result of the determination, when it is determined that an IT service having a multiplexed relation is operated, an alert at a lower impact level than usual is raised (step S3703). For example, IT services such as Service A, Service B, and Service C as illustrated in FIG. 36 are operated, and it is detected that Service A and Service B have multiplexed relations. When only the IT service of Service B goes down, an alert at a lower impact level than usual as a warning level as illustrated in FIG. 38(*c*) is raised.

On the other hand, if it is determined that no other IT service having a multiplexed relation is operated, an alert at a higher impact level than usual is raised (step S3704). In the example above, if Service A has been down when Service B goes down, an alert at a higher impact level than usual as illustrated in FIG. 38(*b*) has been raised.

Furthermore, when it is determined that there is no IT service having a multiplexed relation, a normal alert is raised (step S3705). In the example above, if Service B does not originally exist when Service A goes down, a normal display is performed as illustrated in FIG. 38(a). As described above, according to the third embodiment, an appropriate alert can be raised depending on the multiplexing state. In the embodiment above, a container application name and a deployed application name are referenced from the 1504 as necessary. To refer to the data, a data acquire command is transmitted to the CMDB 1504, and the XML data is received. Described below is an example of the data acquired from the CMDB. The data is simplified for explanation of the present embodiment.

FIG. 39 illustrates a result of executing a command to acquire a list of container applications from the CMDB 1504. There are two pieces of data having type="Interstage" in the tag of ns:Instance. From the data, two container applications Interstage are detected. Furthermore, they are deployed to the servers assigned the IP addresses of 192.168.1.3 and 192.168.1.4 respectively.

FIG. 40 is an example of a subnet address acquisition data from the CMDB 1504, and an example of the condition information referenced from the CMDB 1504. The subnet address of a container application can be designated by mapping the IP address of the data and the IP address of the server to which the container application is deployed.

FIGS. 41 and 42 are examples of the transaction context acquired from the CMDB 1504. TransactionContextFrom is the information about a preceding application, TransactionContextLocal is the information about an intermediate container application, and TransactionContextTo is the information about a subsequent application. The transaction context of a container application can be acquired by mapping the ID of TransactionContextLocal and the ID of the container application. To further trace the applications before and after preceding application and the subsequent application, TransactionContext of the preceding application and the subsequent application is to be detected, and the preceding application or the subsequent application is to be acquired. In the example, the data having the ID value of the tag cmdb: it of 33 is the transaction context of the applications of DB1. From the data, it is known that the subsequent application of the DB 1 is DB 2.

FIG. 43 is an example of the transaction information acquired from the CMDB 1504, and the transaction information about a container application is detected by mapping the value of from or to in TransactionInformation and the ID of the container application.

FIG. 44 is an example of an IT service acquired from the CMDB 1504, and a chain of applications configuring an IT service is expressed as a list of Instance ID corresponding to each application.

FIG. 45 is an example of a configuration of hardware of a computer capable of realizing the system according to the embodiment above.

The computer illustrated in FIG. 45 includes a CPU 4501, memory 4502, an input/output device 4503, an external storage device 4505, a portable record medium drive device 4506 into which a portable record medium 4509 is inserted, and a communication network 4507. These components are interconnected through a bus 4508. The configuration illustrated in FIG. 45 is an example of a computer capable of realizing the system above, and the computer is not limited to the configuration.

The CPU 4501 controls the entire computer. The memory 4502 can be RAM etc. for temporarily storing a program or data stored in the external storage device 4505 (or portable record medium 4509) when the program is executed, the data is updated, etc. The CPU 4501 controls the entire system by reading the program to the memory 4502 and executing it.

The input/output device 4503 detects an inputting operation by a keyboard, a mouse, etc. by a user, the detection result is reported to the CPU 4501, and the data transmitted under the control of the CPU 4501 is output to a display device and a printing device.

The external storage device 4505 is, for example, a hard disk storage device. Mainly, it is used in storing various types of data and programs.

The portable record medium drive device 4506 is to store the portable record medium 4509 such as an optical disk, SDRAM, CompactFlash, etc., and has the function auxiliary to the external storage device 4505.

The communication interface 4507 is a device for connecting a communication line of, for example, a LAN (local area network) or a WAN (wide area network).

The system according to the present embodiment is realized by the CPU 4501 executing each control program corresponding to each operation flowchart for realizing the function of the embodiments of the present invention. The program can be recorded on the portable record medium 4509 and distributed, or can be acquired from the network by the communication interface 4507. Each piece of data is managed after stored on, for example, the external storage device 4505 or the memory 4502. In addition, a work area for execution of each control program is developed as necessary on the memory 4502.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for detecting a multiplexed relation of an application, the device comprising:
    a computer;
    the computer comprising:
    a collector which collects information including configuration information about an information system and communication data transmitted in the information system; and
    a multiplexed application detector which detects that there is a multiplexed application when it is determined according to the collected configuration information and communication data that there are a plurality of applications deployed to any device to be monitored in the information system and having matching application names.

2. The device according to claim 1, wherein
    the collector comprises: a configuration information collection unit which collects the configuration information from the device to be monitored; and a transaction collection unit which collects the communication data, and further comprises a configuration information management database storing the configuration information and the communication data.

3. The device according to claim 1, wherein
    the multiplexed application detector extracts as applications having matching application names from the collection information a combination of applications having matching container application names as names of container applications which are basic software for providing a function of configuring information service or matching deployed application names as names of deployed applications formed by programs and data deployed to the container applications.

4. The device according to claim 1, wherein the multiplexed application detector calculates a subnet address of the applications on which it is determined that there are a plurality of applications based on Internet protocol addresses and subnet masks included in the collection information, and detects an application having matching subnet address as the multiplexed application.

5. The device according to claim 1, wherein the multiplexed application detector extracts, from the collection information, transaction context including a preceding application name and a subsequent application name which are application names of an application executed before and after an application for which it is determined that there are a plurality of applications, and detects as the multiplexed application an application having matching preceding application name and subsequent application name configuring the transaction context.

6. The device according to claim 1, wherein the multiplexed application detector extracts transaction information, about the applications on which it is determined that there are a plurality of applications, including a request message and a response message which are application transmission/reception data from the collection information, and detects as the multiplexed application an application having the request message and the response message which configure the transaction information and match each other.

7. The device according to claim 1, wherein the multiplexed application detector:
  extracts applications having matching container application names of container applications as basic software for providing a function of configuring an information service from the collection information;
  extracts from the collection information, transaction context including a preceding application name and a subsequent application name as container application names of applications performed before and after the applications having the matching container application names;
  extracts from the collection information a deployed application name of a deployed application as a program or data deployed to the container applications having the matching container application names in the application having the matching container application names; and
  extracts as the multiplexed application an application, having matching preceding application name and subsequent application name configuring the transaction context in an application group having matching container application names, and having a partially matching relation in which a part of a deployed application name corresponding to a container application name of an application in the application group matches a part of a deployed application name corresponding to a container application name of another application in the application group, or an inclusive relation in which a deployed application name corresponding to a container application name of an application in the application group includes a deployed application name corresponding to a container application name of another application in the application group.

8. The device according to claim 1, wherein the multiplexed application detector:
  extracts applications having matching container application names of container applications as basic software for providing a function of configuring an information service from the collection information;
  extracts from the collection information, transaction information including a request message and a response message as transmission/reception data of the applications having the matching container application names;
  extracts from the collection information a deployed application name of a deployed application as a program or data deployed to the container applications having the matching container application names in the application having the matching container application names; and
  extracts as the multiplexed application an application, having matching preceding application name and subsequent application name configuring the transaction context in an application group having matching container application names, and having a partially matching relation in which a part of a deployed application name corresponding to a container application name of an application in the application group matches a part of a deployed application name corresponding to a container application name of another application in the application group, or an inclusive relation in which a deployed application name corresponding to a container application name of an application in the application group includes a deployed application name corresponding to a container application name of another application in the application group.

9. The device according to claim 1, wherein the multiplexed application detector:
  calculates a subnet address of the applications on which it is determined that there are a plurality of applications based on Internet protocol addresses and subnet masks included in the collection information, or extracts, from the collection information, transaction context including a preceding application name and a subsequent application name which are application names of an application executed before and after the application, or extracts transaction information including a request message and a response message which are application transmission/reception data from the collection information; and
  detects the multiplexed application in the applications which it is determined that there are a plurality of applications by a combination of one or more of matching of the subnet addresses, matching of the preceding application name and the subsequent application name configuring the transaction context, and matching of the request message and the response message configuring the transaction information.

10. The device according to claim 1, wherein the multiplexed application detector evaluates whether or not a matching state is attained on one or more evaluation items of a subnet in which a multiplexed application is executed, transaction context as data of application names of applications performed before and after the multiplexed application, and transaction information as transmission/reception data of the multiplexed application.

11. The device according to claim 1, further comprising a multiplexed relation information service detector which extracts information services included in the collection information, extracts, as information service group candidates, information services matching each other except a multiplexed application detected by the multiplexed application detector in the extracted information services, and extracts, as an information service group, information service group candidates including a same multiplexed application in the extracted information service group candidates.

12. The device according to claim 11, further comprising an alert output which outputs, when a violation of a service level of the information service is detected, according to a multiplexed relation an alert at a level depending on an operation state of an information service belonging to an information service group including another information service in which the violation is detected.

13. A method for detecting a multiplexed relation of an application when a computer manages an operation state of an application performed by an information system, the method comprising:
  collecting information including configuration information of the information system and communication data transmitted in the information system; and
  detecting an existence of a multiplexed application based on the collected configuration information and communication data when it is determined that there are a plurality of applications which are deployed to any device to be monitored in the information system and match in application names.

14. A computer-readable, non-transitory medium storing a program that causes a computer which manages an application performed by an information processing system, to execute a procedure, the procedure comprising:
  collecting information including configuration information of the information system and communication data transmitted in the information system; and
  detecting an existence of a multiplexed application based on the collected configuration information and communication data when it is determined that there are a plurality of applications which are deployed to any device to be monitored in the information system and match in application names.

15. A computer that detects a multiplexed relation of an application, the computer comprising:
  a processor to execute a procedure, the procedure comprising:
  collecting information including configuration information of an information system and communication data transmitted in the information system; and
  detecting that there is a multiplexed application when it is determined according to the collected configuration information and communication data that there are a plurality of applications deployed to any device to be monitored in the information system and having matching application names.

* * * * *